(12) United States Patent
Inuzuka et al.

(10) Patent No.: US 10,597,818 B2
(45) Date of Patent: Mar. 24, 2020

(54) METHOD FOR MANUFACTURING DYE-ATTACHED SUBSTRATE AND PRINTING DEVICE

(71) Applicant: NIDEK CO., LTD., Gamagori-shi, Aichi (JP)

(72) Inventors: Minoru Inuzuka, Gamagori (JP); Hirokazu Hyodo, Gamagori (JP); Koji Abe, Gamagori (JP)

(73) Assignee: NIDEK CO., LTD., Gamagori-shi (JP)

( * ) Notice: Subject to any disclaimer, the term of this patent is extended or adjusted under 35 U.S.C. 154(b) by 0 days.

(21) Appl. No.: 15/852,754

(22) Filed: Dec. 22, 2017

(65) Prior Publication Data

US 2018/0119340 A1 May 3, 2018

Related U.S. Application Data

(63) Continuation of application No. PCT/JP2016/068164, filed on Jun. 17, 2016.

(30) Foreign Application Priority Data

Jun. 26, 2015 (JP) .................. 2015-128904
Jun. 26, 2015 (JP) .................. 2015-128905
(Continued)

(51) Int. Cl.
*D06P 5/28* (2006.01)
*B41M 5/035* (2006.01)
(Continued)

(52) U.S. Cl.
CPC ........ *D06P 5/004* (2013.01); *B29D 11/00923* (2013.01); *B41M 5/00* (2013.01);
(Continued)

(58) Field of Classification Search
CPC .... B41M 5/025; B41M 5/0256; B41M 5/035; B41M 5/382; B41M 5/38214;
(Continued)

(56) References Cited

U.S. PATENT DOCUMENTS 6,520,999 B1   2/2003  Kamata et al.
7,014,314 B1   3/2006  Kamata et al.
(Continued)

FOREIGN PATENT DOCUMENTS

JP    S60-024991 A    2/1985
JP    2001-059950 A   3/2001
JP    2003-011935 A   1/2003

OTHER PUBLICATIONS

Sep. 13, 2016 International Search Report issued in International Patent Application No. PCT/JP2016/068164.
(Continued)

*Primary Examiner* — Gerard Higgins
(74) *Attorney, Agent, or Firm* — Oliff PLC

(57) ABSTRACT

A method for manufacturing a dye-attached substrate provided with a dye section that includes a sublimable dye to be deposited on a resin body includes a printing step of printing a plurality of units of the dye sections, the dye section for dyeing one resin body or one set of resin bodies constituting one unit, lined up in a longitudinal direction of a long thin substrate, by discharging ink that includes the sublimable dye on the substrate using a printing device, a piece creating step of creating a piece of the substrate that includes the plurality of units of the dye sections, by cutting the substrate on which the dye section is printed, and a drying step of drying the ink of the plurality of units of the dye sections included in the piece of the substrate.

5 Claims, 14 Drawing Sheets

(30) Foreign Application Priority Data

Jun. 26, 2015 (JP) .................................. 2015-128906
Jun. 26, 2015 (JP) .................................. 2015-128907

(51) Int. Cl.
  *B41M 5/00* (2006.01)
  *D06P 5/00* (2006.01)
  *B29D 11/00* (2006.01)

(52) U.S. Cl.
  CPC ................ *B41M 5/035* (2013.01); *D06P 5/00* (2013.01); *B41M 2205/02* (2013.01)

(58) Field of Classification Search
  CPC ...... B41M 5/38228; B41M 5/50; B41M 5/52; B41M 5/502; B41M 2205/02
  USPC ................. 503/227; 428/32.75, 32.76, 195.1
  See application file for complete search history.

(56) References Cited

U.S. PATENT DOCUMENTS

| | | | |
|---|---|---|---|
| 7,465,695 B2* | 12/2008 | Tischer | D03D 1/0011 503/227 |
| 2003/0007055 A1 | 1/2003 | Ogawa | |
| 2003/0063256 A1 | 4/2003 | Inuzuka | |

OTHER PUBLICATIONS

Sep. 13, 2016 Written Opinion issued in International Patent Application No. PCT/JP2016/068164.
Feb. 18, 2019 Search Report issued in European Patent Application No. 16814286.7.
Sep. 27, 2019 Office Action issued in Japanese Patent Application No. 2015-128906.
Jul. 16, 2019 Office Action issued in Japanese Patent Application No. 2015-128906.

* cited by examiner

FIG. 9

| INK DETERMINATION TABLE | |
|---|---|
| BASE MATERIAL | INK TO BE USED (INK HEAD TO BE USED) |
| BASE MATERIAL A | BK, B1, R1, Y1 |
| BASE MATERIAL B | BK, B1, R1, Y1 |
| BASE MATERIAL C | BK, B2, R1, Y1 |
| BASE MATERIAL D | BK, B2, R1, Y1 |
| BASE MATERIAL E | BK, B1, R2, Y3 |
| BASE MATERIAL F | BK, B2, R1, Y2 |
| ⁓ | ⁓ |

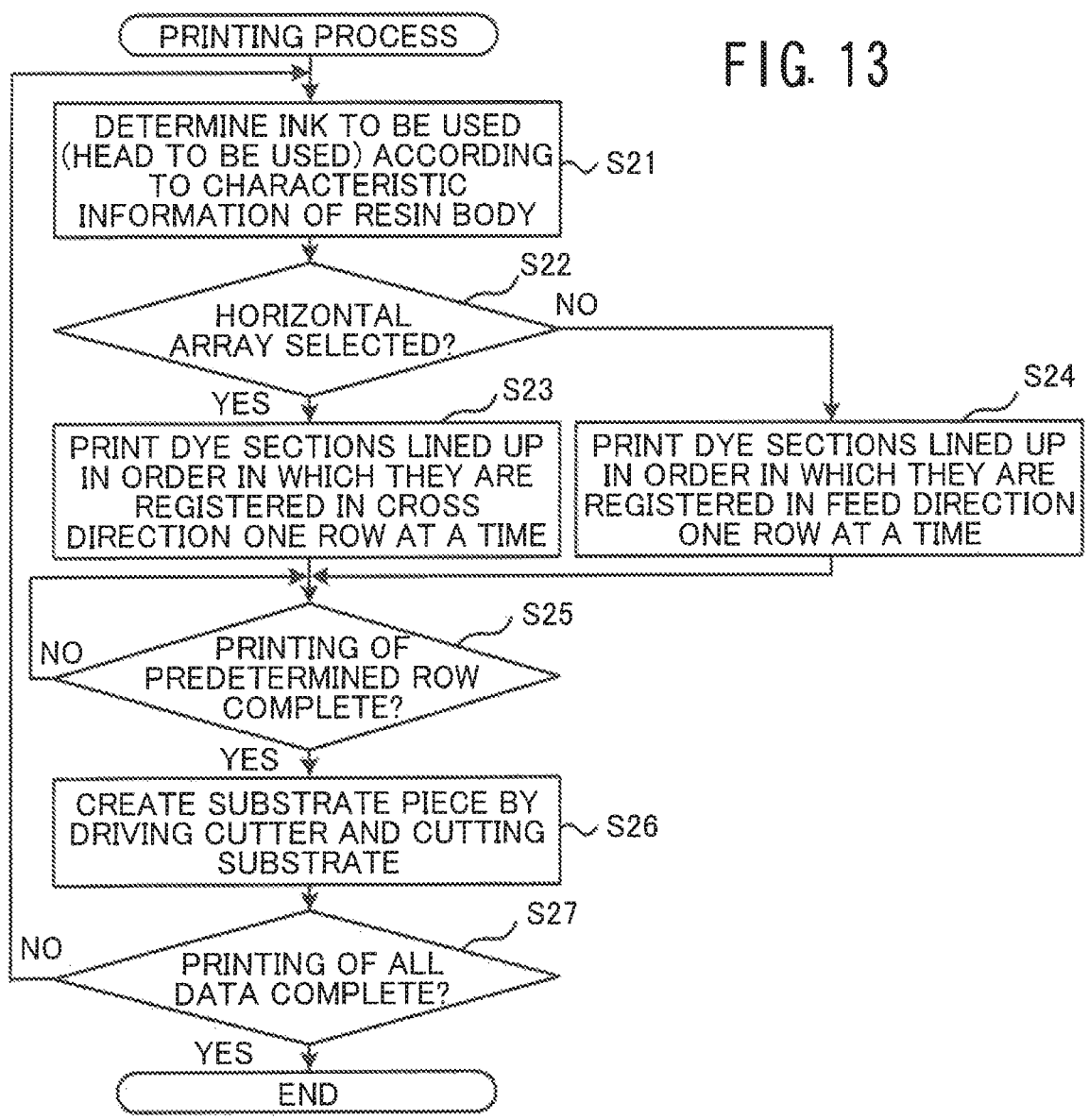

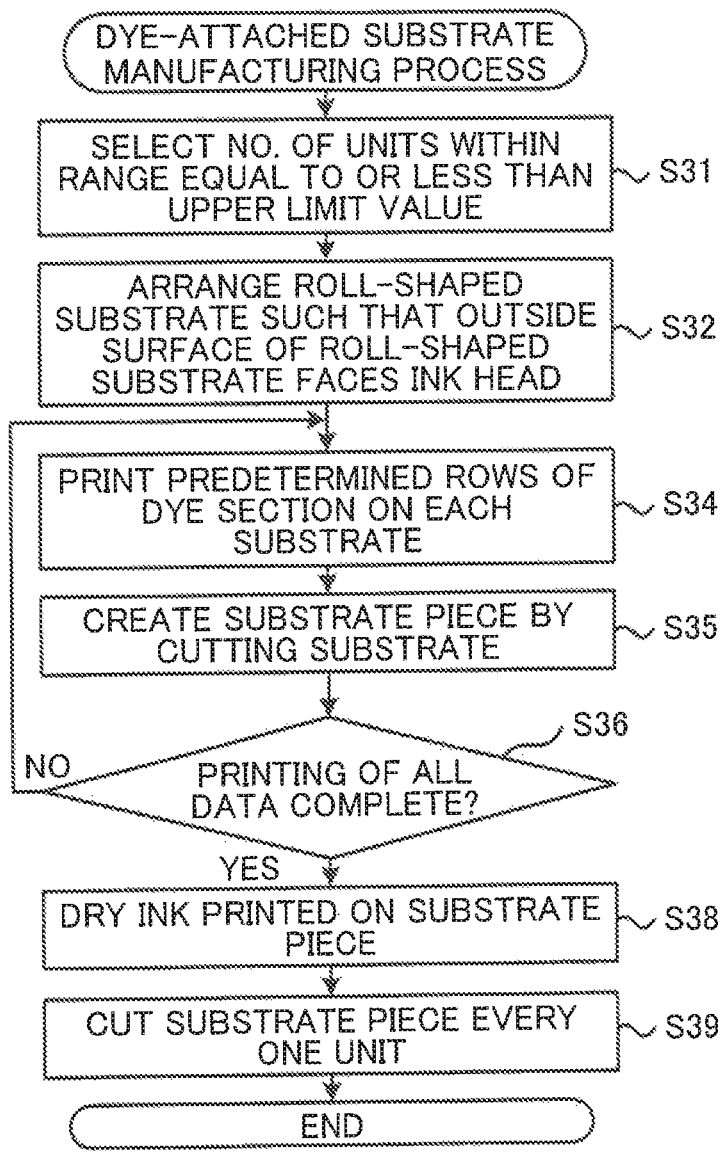

METHOD FOR MANUFACTURING DYE-ATTACHED SUBSTRATE AND PRINTING DEVICE

CROSS-REFERENCE TO RELATED APPLICATION

This application is a continuation application of International Application No. PCT/JP2016/068164, filed Jun. 17, 2016, which claims priority from Japanese Patent Application Nos. 2015-128904, filed Jun. 26, 2015, 2015-128905, filed Jun. 26, 2015, 2015-128906, filed Jun. 26, 2015, and 2015-128907, filed Jun. 26, 2015. The disclosure of the foregoing applications is hereby incorporated by reference in their entirety.

BACKGROUND

The present disclosure relates to a method for manufacturing a dye-attached substrate used in a transfer dyeing process, and a printing device used to manufacture a dye-attached substrate.

In the past, various kinds of technology for dyeing a resin body (such as a plastic lens, for example) have been proposed. For example, with a known vapor phase transfer dyeing method, a sublimable dye that is adhered to a to-be-dyed substrate is heated, and the heated sublimable dye is deposited on a resin body. The to-be-dyed substrate is obtained by printing ink in which sublimable dye is dispersed, onto blank paper by a printer.

SUMMARY

With known technology, a dye-attached substrate is obtained by ink that includes a sublimable dye being printed onto each of a plurality of sheets of substrate (for example, paper) that have been precut into predetermined a size. In this case, it is necessary to perform various subsequent operations for each of the substrates on which the ink is printed. Therefore, it is difficult to improve work efficiency.

Embodiments of the broad principles derived herein provide a manufacturing method and printing device capable of efficiently manufacturing a dye-attached substrate.

Embodiments provide a method for manufacturing a dye-attached substrate provided with a dye section that includes a sublimable dye to be deposited on a resin body. The method includes a printing step of printing a plurality of units of the dye sections, the dye section for dyeing one resin body or one set of resin bodies constituting one unit, lined up in a longitudinal direction of a long thin substrate, by discharging ink that includes the sublimable dye on the substrate using a printing device, a piece creating step of creating a piece of the substrate that includes the plurality of units of the dye sections, by cutting the substrate on which the dye section is printed, and a drying step of drying the ink of the plurality of units of the dye sections included in the piece of the substrate.

Embodiments further provide a printing device that includes an ink head that prints a dye section that includes a sublimable dye to be deposited on a resin body, on a substrate by discharging ink that includes the sublimable dye toward the substrate, a cutter that cuts the substrate, and a processor that controls operation of the printing device. The processor causes a plurality of units of the dye sections to be printed on the substrate that is long and thin, the dye section for dyeing one resin body or one set of resin bodies constituting one unit, by controlling the driving of the ink heads, and creates a piece of the substrate that includes the plurality of units of the dye sections, by controlling the driving of the cutter to cut the substrate.

BRIEF DESCRIPTION OF THE DRAWINGS

FIG. 9 is an explanatory view illustrating an ink determination table.

FIG. 13 is a flowchart of a printing process executed by the printing device 10.

FIG. 14 is a flowchart of a dye-attached substrate manufacturing process.

DETAILED DESCRIPTION

Figure 1:
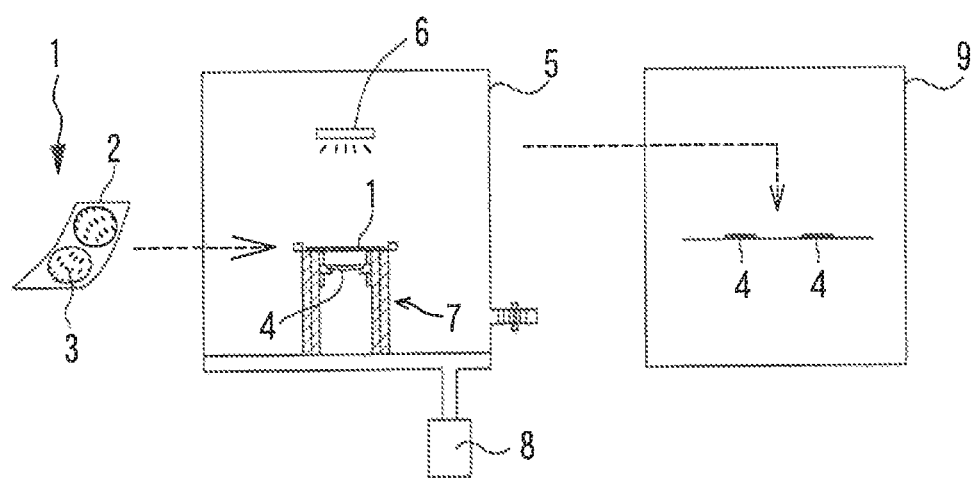
FIG. 1 is an explanatory view illustrating a dyeing process of an embodiment.

Because a to-be-dyed substrate is wound in a roll shape, the roll-shaped to-be-dyed substrate has a tendency to curl. Therefore, when adhering a sublimable dye to a to-be-dyed substrate, problems such as clogging and the to-be-dyed substrate getting ensnared, occurred as a result of the to-be-dyed substrate coining into contact with an ink head of a printing device. It is an object of a first aspect of the present disclosure to provide a method for manufacturing a dye-attached substrate, and a method for manufacturing a dyed resin body, capable of suppressing problems that occur when manufacturing a dye-attached substrate used in a dyeing process of a resin body.

When a user sets a desired color and dyes a resin body with the set color, the resin body may end up being a color different than the set color due to differences in the characteristics (for example, base material, thickness, shape, etc.) of the resin body. Also, there are cases where the resin body is unable to be dyed well. It is an object of a second aspect of the present disclosure to provide a printing control device, a printing device, and a printing control program capable of suitably dyeing a desired color.

With known technology, a dye-attached substrate is obtained by ink that includes a sublimable dye being printed onto each of a plurality of sheets of substrate (for example, paper) that have been precut into predetermined a size. In this case, it is necessary to perform various subsequent operations for each of the substrates on which the ink is printed. Therefore, it is difficult to improve work efficiency. It is an object of a third aspect of the present disclosure to provide a manufacturing method and printing device capable of efficiently manufacturing a dye-attached substrate.

With known technology, a dye-attached substrate is obtained by ink that includes a sublimable dye being printed hi order onto each of the substrates (for example, paper), one at a time, that have been precut into predetermined a size. In this case, the dye-attached substrate can only be manufactured one at a time, so it is difficult to improve work efficiency. It is an object of a fourth aspect of the present disclosure to provide a printing device and a print control data generating program capable of efficiently manufacturing a dye-attached substrate.

In order to solve the aforementioned problems, the present disclosure includes the configuration described below.

(1) A method for manufacturing a dye-attached substrate according to a first aspect of the present disclosure is a method for manufacturing a dye-attached substrate to be used in a dying process for dyeing a resin body by heating a sublimable dye to cause the dye to sublimate toward the resin body, and the method includes an arranging step of arranging a to-be dyed substrate, to which the dye is to be adhered, that is formed in a roll shape, and of which a surface on the side to which the dye is to be adhered is formed on an outside surface of the roll-shaped to-be-dyed substrate, in a printing device, such that the outside surface of the roll-shaped to-be-dyed substrate faces an ink head of the printing device, when printing the dye on the to-be-dyed substrate using the printing device, and a printing step of printing the dye on the to-be-dyed substrate, by discharging ink that includes the dye to be deposited on the resin body, toward the to-be-dyed substrate using the ink head of the printing device.

(2) A method for manufacturing a dyed resin body according to the first aspect of the present disclosure includes a depositing step of depositing the dye on the resin body by sublimating the dye printed on the dye-attached substrate manufactured according to the method according to (1) for manufacturing the dye-attached substrate, by making the dye-attached substrate face the resin body and heating the dye-attached substrate, and a fixing step of fixing the dye by heating the resin body on which the dye is deposited.

A printing control device according to a second aspect of the present disclosure is a printing control device that includes an obtaining means for obtaining characteristic information of a resin body to be dyed, and a selecting means for selecting, on the basis of the characteristic information obtained by the obtaining means, an ink to be used for dyeing the resin body, from a plurality of inks that each include a sublimable dye to be deposited on the resin body, the plurality of inks including at least two or more inks of the same color that have different suitabilities for the resin body.

(4) A printing device according to the second aspect of the present disclosure is a printing device that includes ink heads that print a sublimable dye to be deposited on a resin body on a to-be-dyed substrate by discharging ink that includes the sublimable dye toward the to-be-dyed substrate, the number of ink heads being larger than the number of colors of ink to be used for printing on the to-be-dyed substrate, a control unit that controls operation of the printing device, an obtaining means for obtaining characteristic information of the resin body to be dyed, and a selecting means for selecting, on the basis of the characteristic information obtained by the obtaining means, an ink to be used for dyeing the resin body, from a plurality of inks that include a sublimable dye to be deposited on the resin body, the plurality of inks including at least ore inks of the same color that have different suitabilities for the resin body, and the control unit causes the dye to be printed on the to-be-dyed substrate by discharging ink from an ink head that discharges the ink selected by the selecting means, among the plurality of ink heads.

(5) A printing control program to the second aspect of the present disclosure is a printing control program executed in a printing control device that controls operation of a printing device, and the printing control program, when executed by a processor of the printing control device, causes the printing control device to execute an obtaining step of obtaining characteristic information of a resin body to be dyed, and a selecting step of selecting, on the basis of the characteristic information obtained in the obtaining step, an ink to be used for dyeing the resin body, from a plurality of inks that include a sublimable dye to be deposited on the resin body, the plurality of inks including at least two or more inks of the same color that have different suitabilities for the resin body.

(6) A method for manufacturing a dye-attached substrate according to a third aspect of the present disclosure is a method for manufacturing a dye-attached substrate provided with a dye section that includes a sublimable dye to be deposited on a resin body, and the method includes a printing step of printing a plurality of units of the dye sections, the dye section for dyeing one resin body or one set of resin bodies constituting one unit, lined up in a longitudinal direction of a long thin substrate, by discharging ink that includes the sublimable dye on the substrate using a printing device, a piece creating step of creating a piece of the substrate that includes the plurality of units of the dye sections, by cutting the substrate on which the dye section is printed, and a drying step of drying the ink of the plurality of units of the dye sections included in the piece of the substrate.

(7) A printing device according to the third aspect of the present disclosure is a printing device that includes an ink head that prints a dye section that includes a sublimable dye to be deposited on a resin body, on a substrate by discharging ink that includes the sublimable dye toward the substrate, a cutter that cuts the substrate, and a control unit that controls operation of the printing device, and the control unit causes a plurality of units of the dye sections to be printed on the substrate that is long and thin, the dye section for dyeing one resin body or one set of resin bodies constituting one unit, by controlling the driving of the ink heads, and creates a piece of the substrate that includes the plurality of units of the dye sections, by controlling the driving of the cutter to cut the substrate.

(8) A printing device according to a fourth aspect of the present disclosure is a printing device that includes a substrate loading portion that loads a plurality of long, thin sheet-like substrates, a feed portion that feeds, along the longitudinal direction of the substrates, the plurality of substrates loaded in the substrate loading portion, an ink head that prints a dye section that includes a sublimable dye to be deposited on a resin body, on the plurality of substrates by discharging ink that includes the sublimable dye toward the plurality of substrates fed by the feed portion, and a control unit that controls operation of the printing device, and the control unit causes one unit or a plurality of units of the dye sections to be printed on the plurality of substrates, the dye section for dyeing one resin body or one set of resin bodies constituting one unit, by controlling the driving of the feed portion and the ink head.

(9) A printing control data generating program according to the fourth aspect of the present disclosure is a printing control data generating program executed by a data generating device that generates printing control data for controlling operation of a printing device, the printing device includes a substrate loading portion that loads a plurality of long, thin sheet-like substrates, a feed portion that feeds, along a longitudinal direction of the substrates, the plurality of substrates loaded in the substrate loading portion, and an ink head that prints a dye section that includes a sublimable dye to be deposited on a resin body on the plurality of substrates, by discharging ink that includes the sublimable dye toward the plurality of substrates fed by the feed portion, and the printing control data generating program, when executed by a processor of the data generating device, causes the printing control device to execute a data generating step of generating printing control data for printing one unit or a plurality of units of the dye sections on the plurality of substrates, the dye section for dying one resin body or one set of resin bodies constituting one unit.

Hereinafter, a typical embodiment of the present disclosure will be described. A dye-attached substrate 1 of the present embodiment is used in a process of manufacturing a dyed resin body by performing transfer dyeing on a resin body. Hereinafter, a case in which a plastic lens 4, which is an example of the resin body, is dyed by vapor phase transfer dyeing using the dye-attached substrate 1 will be illustrated. However, the technology illustrated below may also be applied to dyeing resin bodies other than the plastic lens 4 (for example, a mobile phone cover, a light cover, an accessory, a toy, etc.). Also, the dye-attached substrate 1 illustrated below may be used in a process of transfer dyeing other than vapor phase transfer dyeing.

According to the present embodiment, it is also possible to dye a resin body made of, for example, high refractive material such as polycarbonate resin (for example, a diethylene glycol bisallyl carbonate polymer (CR-39)), polyurethane resin, allyl resin (for example, allyl diglycol carbonate and a copolymer thereof, or diallyl phthalate and a copolymer thereof), fumaric acid resin (for example, a benzyl fumarate copolymer), styrene resin, polymethyl acrylate resin, fiber resin (for example, cellulose propionate), or thiourethane or thioepoxy or the like.

Transfer Dyeing Process

A process of dyeing a resin body (the plastic lens 4 in the present embodiment) using the dye-attached substrate 1 (manufacturing process of a dyed resin body) will be described with reference to FIG. 1. First, a manufacturing process of the dye-attached substrate 1 is performed. The dye-attached substrate 1 of the present embodiment includes a dye section 3 on one surface of a sheet-like substrate (to-be-dyed substrate) 2. The dye section 3 includes a sublimable dye to be deposited onto the plastic lens 4. In the present embodiment, a pair of the dye sections 3 is formed as one unit on the substrate 2 in order to dye one set of (one pair of two) plastic lenses 4 to be fitted to eyeglasses. The details of the manufacturing process of the dye-attached substrate 1 will be described later.

Next, a transfer process of transferring the dye adhered to the dye-attached substrate 1 to the plastic lens 4 is performed. In the present embodiment, the sublimable dye included in the dye section 3 of the dye-attached substrate 1 is sublimed toward the plastic lens 4 by the dye being heated. As a result, the dye is deposited onto the plastic lens 4. Various layers, such as a receiving film for facilitating fixing of the dye through a fixing process, described later, may be formed on the plastic lens 4.

The transfer process (vapor deposition process) of the present embodiment is performed by a vapor deposition portion 5. The vapor deposition portion 5 includes an electromagnetic wave generating portion 6, a vapor deposition jig 7, and a pump 8. The electromagnetic wave generating portion 6 increases the temperature of the dye in a short period of time by irradiating electromagnetic waves to the dye-attached substrate 1. In the present embodiment, a halogen lamp that generates infrared light is used as the electromagnetic wave generating portion 6. However, a component that generates electromagnetic waves of another wavelength such as ultraviolet rays and microwaves may be used as the electromagnetic wave generating portion 6. Also, the sublimable dye may be heated by another method. For example, the sublimable dye may be heated by bringing an iron plate or the like that has reached a high temperature into contact with the dye-attached substrate 1. The vapor deposition jig 7 holds the dye-attached substrate 1 and the plastic lens 4. The vapor deposition jig 7 in the present embodiment holds the dye-attached substrate 1 in a position a suitable distance away from the plastic lens 4. As a result, color unevenness and the like in the dye to be deposited onto the plastic lens 4 is suppressed. Also, the dye-attached substrate 1 is arranged such that the surface to which the dye section 3 is adhered faces the plastic lens 4. The pump 8 lowers the air pressure inside the vapor deposition portion 5 by discharging gas that is inside the vapor deposition portion 5 to the outside. The transfer process of the present embodiment is performed in a state in which the air pressure around the dye-attached substrate 1 and the plastic lens 4 has been reduced (for example, substantially a vacuum state). Therefore, the sublimable dye is suitably sublimated and deposited on the plastic lens 4, compared to when vapor deposition is performed under atmospheric pressure.

Next, the fixing process is performed. In the fixing process, the dye is fixed to the plastic lens 4 by the plastic lens 4 on which the dye has been deposited being heated. As a result, a dyed resin body is manufactured. The fixing process of the present embodiment is performed by an oven 9. When the oven. 9 (in particular, a blower-type constant temperature temperature-controlled machine) is used, the temperature of the plastic lens 4 gradually increases over an extended period of time, so a temperature difference tends not to occur. As a result, the dye tends to fix evenly to the plastic lens 4 deposited onto the plastic lens 4. The content of the fixing process may be modified. For example, the plastic lens 4 may be heated by scanning a laser over the plastic lens 4. Also, the transfer process acid the fixing process may be both performed by the same apparatus. In this case, for example, the heating in the transfer process and the heating in the fixing process may be performed by the same heating means (for example, an infrared heater or the like).

Printing Device

Figure 2:
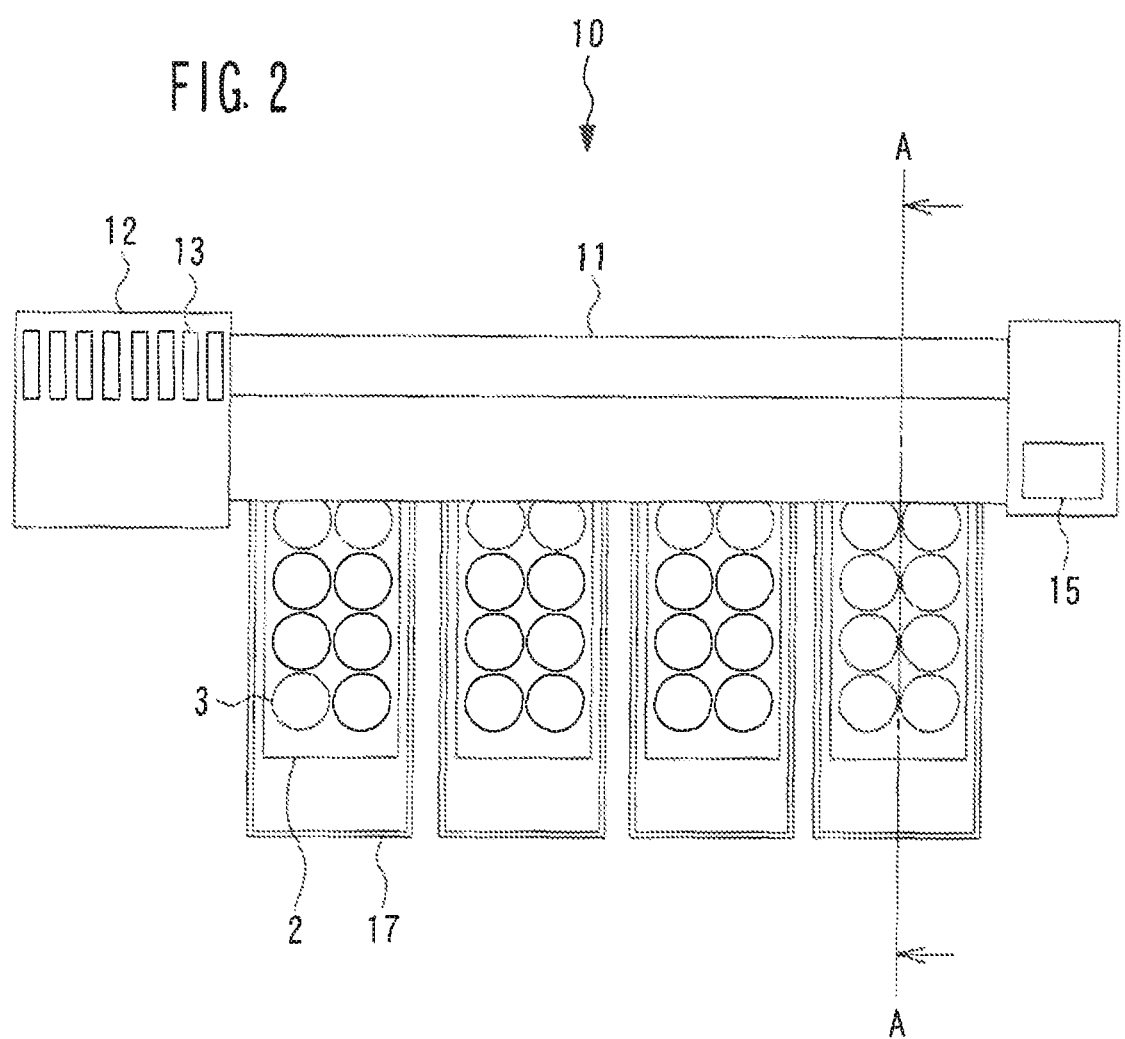
FIG. 2 is a plan view of a printing device 10.

One example of a printing device 10 used in the manufacturing process of the dye-attached substrate 1 will be described with reference to FIG. 2 to FIG. 4. As illustrated in FIG. 2, the printing device 10 includes a case 11, an ink container loading portion 12, and an operation unit 15. The case 11 holds various components of the printing device 10. The internal components of the case 11 will be described later. An ink container (for example, an ink pack or an ink cartridge, etc.) is loaded in the ink container loading portion 12. Eight ink heads 33 (see FIG. 4) that discharge ink are provided in the printing device 10 of the present embodiment. Therefore, eight slots 13 into which the ink containers are loaded are provided in the ink container loading portion 12 in order to supply ink to each of the eight ink heads 33. Various operation commands are input to the operation unit 15.

The substrate 2 on which the dye section 3 has been printed is fed forward from the case 11, A tray 17 on which the substrate 2 that has been fed from the case 11 is to be placed is arranged in front of the case 11. The tray 17 is detachably provided with respect to the body of the printing device 10. Therefore, a user is able to easily transport one or a plurality of substrates 2 that has been placed on the tray 17 by removing the tray 17.

A long thin (i.e., elongated) sheet-like substrate 2 is used as the substrate 2 of the present embodiment. As an example, the substrate 2 of the present embodiment is long thin paper (roll paper) that is wound in a roll shape. However, material other than roll paper (for example, sheet-like metal foil or sheet-like resin or the like) may also be used as the substrate 2. A plurality of (as an example, four in the present embodiment) the substrates 2 may also be loaded and the printing device 10 can print the dye sections 3 in parallel on each of the loaded plurality of substrates 2. The printing device 10 of the present embodiment includes four trays 17 in order to accommodate each of the four substrates 2 fed from the case 11.

Figure 3:
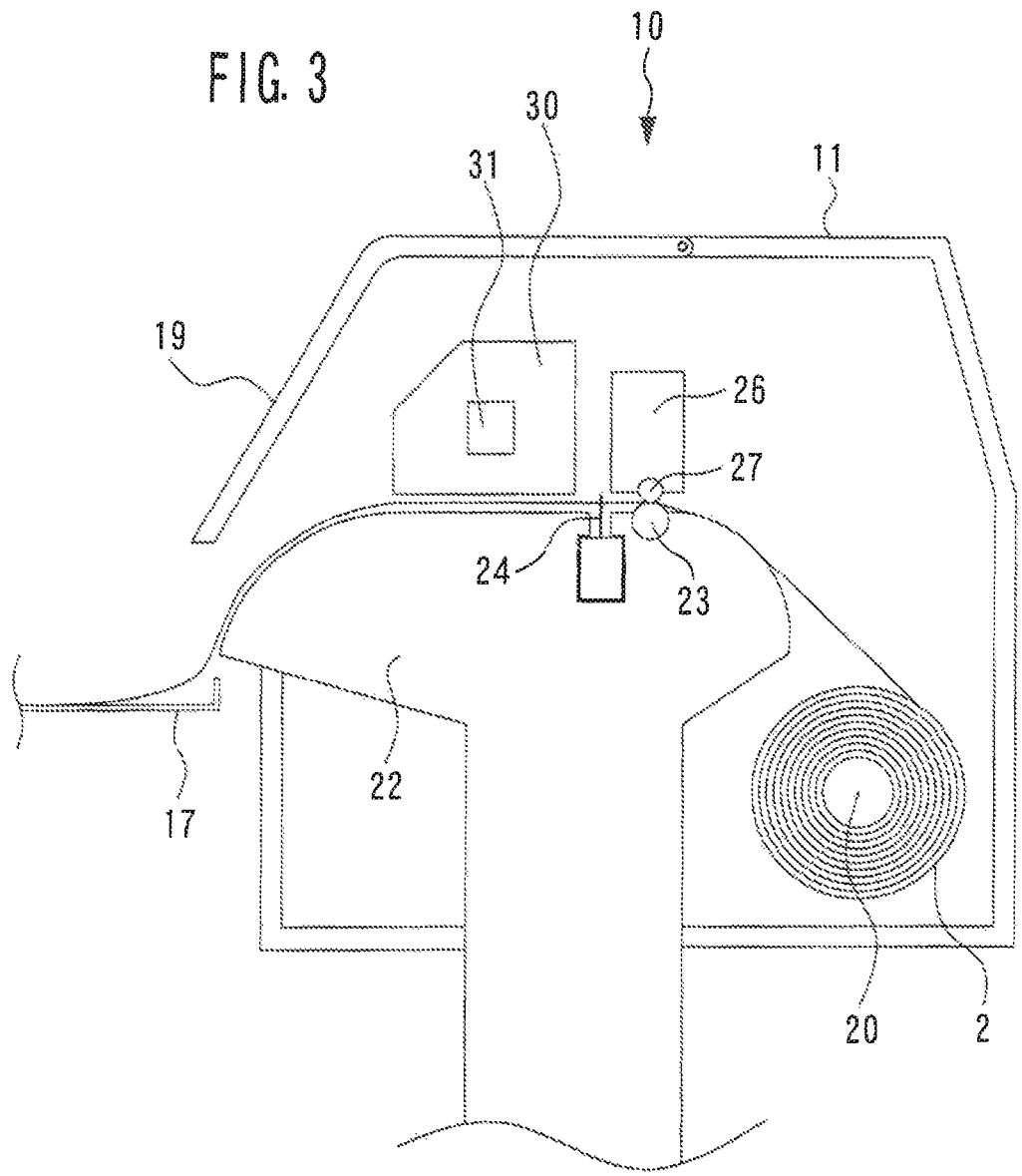
FIG. 3 is a sectional view in the direction of the arrows along line A-A in FIG.
Figure 4:
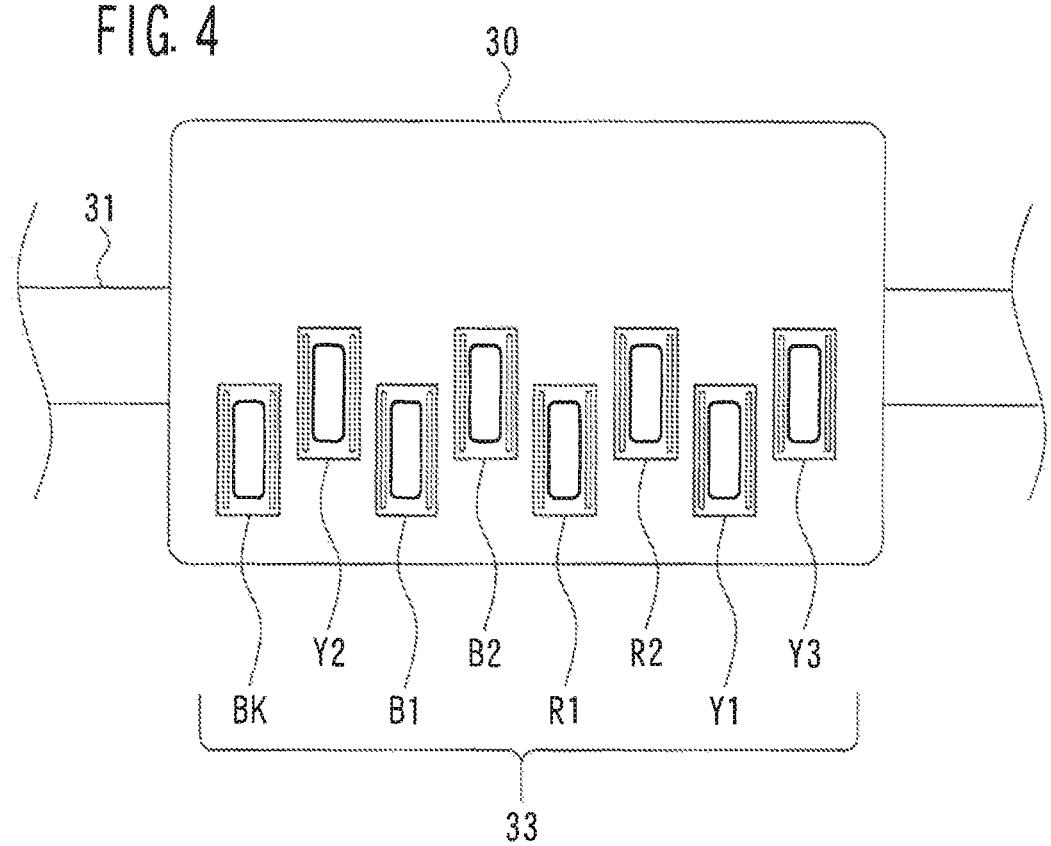
FIG. 4 is a bottom view of a carriage 30.

As illustrated in FIG. 3, the case 11 of the printing device 10 is formed in a general box-shape with the front upper portion open. An access cover 19 is attached to an upper end portion of the case 11 in a manner able to pivot in the up-down direction. The front upper portion of the case 11 is opened by the access cover 19 being rotated upward. A substrate loading portion 20 that loads the substrate 2 is provided in a rear lower portion of the printing device 10. In the present embodiment, the long thin sheet-like substrate 2 is loaded onto the substrate loading portion 20 in a state wound in a roll shape. The substrate loading portion 20 of the present embodiment is able to rotatably retain the roll-shaped to-be-dyed substrate 2 (hereinafter, also referred to as "roll-shaped substrate 2") by being fit into the axial center portion of the roll-shaped substrate 2. Moreover, the substrate loading portion 20 of the present embodiment includes a jig (not shown) arranged between adjacent roll-shaped substrates 2. The jig keeps the distance between a plurality of the roll-shaped substrates 2 at a fixed distance. The arrangement relationship between the printing device 10, and the inside surface and outside surface of the roll-shaped substrate 2 will be described later.

A lower base 22, an upper base 26, a carriage 30, and a guide rail 31 are provided in the case 11. The lower base 22 is positioned below the substrate 2 to be fed out. The upper base 26 is positioned above the substrate 2 to be fed out. That is, the substrate 2 passes in a front-rear direction between the lower base 22 and the upper base 26.

A feed portion 23 is provided on a rear portion of an upper end of the lower base 22. The feed portion 23 feeds out the substrate 2 (four substrates 2 in the present embodiment) loaded on the substrate loading portion 20, along the longitudinal direction of the substrate 2. As one example, the feed portion 23 of the present embodiment is a grid roller of which a rotating shaft extends in the left-right direction. The feed portion 23 of the present embodiment feeds out the four substrates 2 by being rotated by a substrate feed motor 35 (see FIG. 6). A pinch roller 27 that presses the substrate 2 toward the feed portion 23 is provided on a lower end of the upper base 26. The rotating shaft of the pinch roller 27 is parallel to the rotating shaft of the feed portion 23. The configuration of the feed portion 23 may be modified. For example, the feed portion 23 may feed each of the plurality of substrates 2 individually.

A cutter 24 that cuts the substrate 2 is provided in front of the feed portion 23 on the upper end of the lower base 22. The cutter 24 of the present embodiment cuts the long thin substrate 2 in the transverse direction by being moved in the left-right direction by a cutter driving motor 36 (see FIG. 6).

The carriage 30 and the guide rail 31 are provided above the lower base 22 and forward of the feed portion 23. The guide rail 31 is a rod-shaped member that extends in the left-right direction and is fixed to the case 11. The carriage 30 has a plurality of ink heads 33 (see FIG. 4) in the bottom portion. The carriage 30 moves in the left-right direction along the guide rail 31 by a carriage motor 37 (see FIG. 6). The printing device 10 performs printing in main scanning direction by discharging ink from the ink heads 33, while moving the carriage 30 in the left-right direction (the main scanning direction). Also, the printing device 10 performs sub-scanning by moving the substrate 2 in the front-rear direction with the feed portion 23. A two-dimensional dye section 3 is printed on a printing surface of the substrate 2 by the main scanning and the sub-scanning being repeatedly performed. The methods of main scanning and sub-scanning may be modified. For example, the printing device 10 may move the carriage 30 in the main scanning direction and the sub-scanning direction. Also, the printing device 10 may move the substrate 2 in the main scanning direction and the sub-scanning direction, with respect to the ink heads 33 that are fixed.

Relationship Between Types of Ink and Ink Heads

The relationship between types of ink and the ink heads 33 of the present embodiment will be described with reference to FIG. 4. The plurality of ink heads 33 are provided in the bottom portion of the carriage 30, as illustrated in FIG. 4. For example, the ink heads 33 print the dyeing section 3 on the substrate 2 by discharging ink that includes a sub-limable dye that is deposited on a resin body, toward the to-be-dyed substrate. Each of the plurality of ink heads 33 is individually connected by an ink supply channel (for example, a flexible tube) to a respective one of the plurality of ink containers loaded into the ink container loading portion 12 (see FIG. 2). Therefore, in the present embodiment, ink is supplied from one ink container to one ink head 33.

As an example, in the present embodiment, the color of the dye section. 3 to be printed on the substrate 2 (in other words, the color of the resin body to be dyed by the dyeing process using the dye-attached resin body 1) is reproduced by four colors of ink, i.e., black (BK), blue (B), red (R), and yellow (Y), being selectively discharged as appropriate. On the other hand, the number of ink heads 33 included in the printing device 10 of the present embodiment is eight. That is, the printing device 10 of the present embodiment includes more ink heads 33 than the number of colors of ink used to reproduce the color of the resin body to be dyed (hereinafter, referred to as "number of colors used").

In the present embodiment, a portion of the plurality of ink heads 33 includes a plurality of ink heads 33 each of which discharges at least two or more inks of the same color that have mutually different suitabilities for the resin body. As an example, there is one type of black ink used in the present embodiment, and this black ink is discharged from the BK ink head 33 illustrated in FIG. 4. The black ink of the present embodiment is suitable for dyeing various kinds of base materials. There are two types of blue ink. One blue ink is discharged from the B1 ink head 33, and the other blue ink is discharged from the B2 ink head 33. There are two types of red ink. One red ink is discharged from the R1 ink head 33, and the other red ink is discharged from the R2 ink head 33. There are three types of yellow ink. The three types of yellow ink are discharged one from each of the Y1, Y2, and Y3 ink heads 33. As will be described later in detail, the printing device 10 of the present embodiment selects one or a plurality of inks suitable for the characteristics (for example, the base material of the resin body) of the resin body to be dyed, from among a plurality of types of inks of the same color, and prints the ink on the substrate 2.

The number of colors used, the type of ink to be used, and the number of ink heads 33, and the like may be changed. For example, the color of the dye section 3 may be reproduced by the three colors of cyan (C), magenta (M), and yellow (Y). The color of the dye section 3 may be reproduced by the four colors of cyan (C), magenta (M), yellow (Y), and black (K). The color of the dye section 3 may be reproduced by a combination of the three colors of cyan (C), magenta (M), and yellow (Y), and the three colors of red (R), yellow (Y), and blue (B). Ink of another color (for example, brown or the like) may be used. A plurality of types of black ink may be used.

Arrangement of the Roll-Shaped Substrate in the Printing Device

Figure 5:
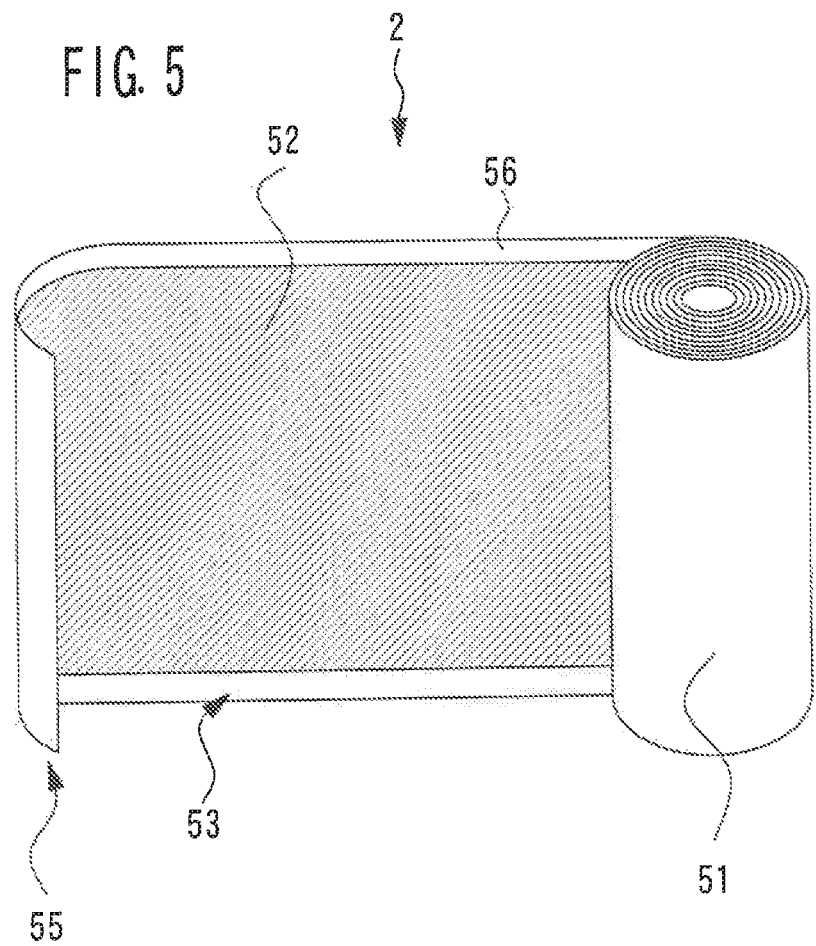
FIG. 5 is an external view of a roll-shaped substrate 2.

FIG. 5 is a configuration diagram of the substrate 2. For example, the substrate 2 is used in a dyeing process (manufacturing process of a dyed resin body) for dyeing the plastic lens 4 by heating the sublimable dye adhered to the substrate 2 so as to cause the dye to sublimate toward the resin body.

For example, the substrate 2 includes a surface (hereinafter, referred to as a dyeing surface) 51 to which the dye adheres. The dyeing surface 51 is a surface on which the dyeing section 3 is to be printed. Also, for example, the substrate 2 includes an electromagnetic wave absorbing layer 52 that has a higher electromagnetic wave absorption rate than the substrate 2. The electromagnetic wave absorbing layer 52 is formed at least on the side opposite the dyeing surface 51. For example, the substrate 2 is a substrate formed in a roll shape, and the dyeing surface 51 is formed on an outside surface of the roll-shaped substrate 2. Also, for example, with the substrate 2, the electromagnetic wave absorbing layer 52 is formed on an inside surface 53 of the roll-shaped substrate 2.

For example, the electromagnetic wave absorbing layer 52 need only be able to absorb at least electromagnetic waves of a wavelength generated by the electromagnetic wave generating portion 6, at a higher absorption rate than the substrate 2. As an example, in the present embodiment, the electromagnetic wave absorbing layer 52 is formed by colored ink that includes a heat-resistant black or a dark (black in the present embodiment) pigment. As illustrated in FIG. 5, the electromagnetic wave absorbing layer 52 of the present embodiment is formed in a region occupying a portion of one surface of the substrate 2 (formed leaving a margin 56). Therefore, the cost of the substrate 2 is lower than when the electromagnetic wave absorbing layer 52 is formed on the entire one surface.

In the present embodiment, the substrate 2 having a configuration in which the dyeing surface 51 is formed on the outside surface of the roll-shaped substrate 2 and the electromagnetic wave absorbing layer 52 is formed on the inside surface 53 of the roll-shaped substrate 2, is described as an example, but the configuration is not limited to this. The configuration need only be such that at least the dyeing surface 51 is formed on the outside surface of the roll-shaped substrate 2.

For example, the substrate 2 is used loaded in the printing device 10. For example, a user loads the substrate 2 onto the substrate loading portion 20. Here, for example, the substrate 2 is wound in a roll shape, so the roll-shaped substrate 2 has a curled section (a tendency to curl) 55. Therefore, when printing the dyeing section 3 on the substrate 2, the substrate 2 may contact the ink heads 33 of the printing device 10, and as a result, problems such as clogging and the to-be-dyed substrate getting ensnared may occur.

As illustrated in FIG. 3 and FIG. 5, in the present embodiment, when printing the dyeing section 3 with the printing device 10, the user arranges the substrate 2 on the substrate loading portion 20 of the printing device 10 such that the outside surface of the roll-shaped substrate 2 faces the ink heads 33 of the printing device 10. That is, the curled section 55 is able to be inhibited from contacting the ink heads 33 by arranging the roll-shaped substrate 2, in which the dyeing surface 51 is formed on the outside surface, on the substrate loading portion 20 of the printing device 10, such that the outside surface of the substrate 2 faces the ink heads 33 of the printing device 10.

Electrical Configuration

Figure 6:
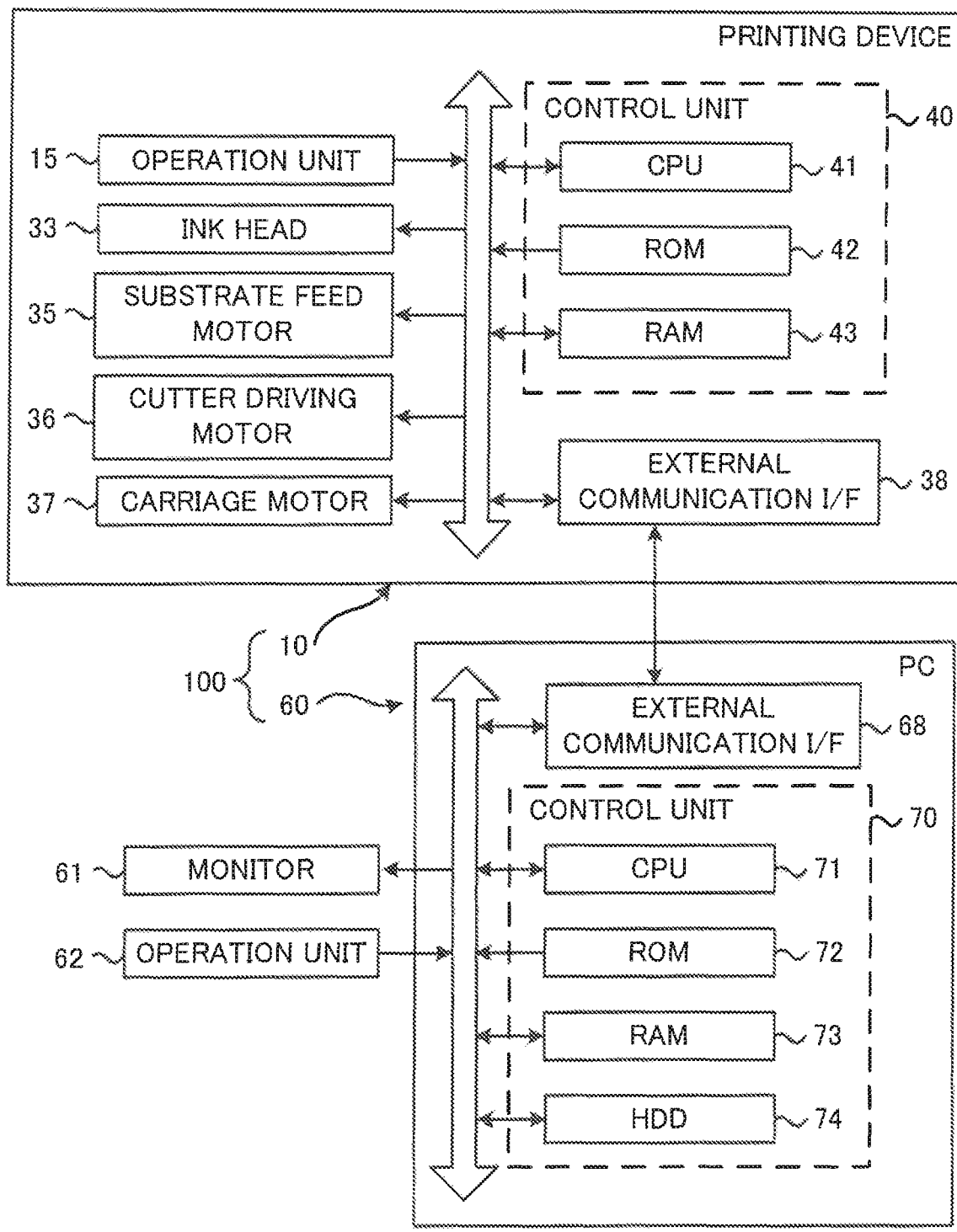
FIG. 6 is a block view illustrating the electrical configuration of a dye-attached substrate manufacturing system 100 that includes a printing device 1 and a PC 60.

The electrical configuration of a dye-attached substrate manufacturing system 100 of the present embodiment will be described with reference to FIG. 6. The dye-attached substrate manufacturing system of the present embodiment includes the printing device 10 and a personal computer (hereinafter, referred to as "PC") 60.

The printing device 10 includes a control unit 40 that controls the operation of the printing device 10. The control unit 40 has a CPU (processor) 41, ROM 42, and RAM 43. The CPU 41 is responsible for controlling each part of the printing device 10. A control program for controlling the operation of the printing device 10 (such as a printing control program for executing the printing process illustrated in FIG. 13, for example), and initial values and the like, are stored in the ROM 42. The control program may be stored in non-volatile memory, not shown. Various types of information are temporarily stored in the RAM 43. The operation unit 15, the ink heads 33, the substrate feed motor 35, the cutter driving motor 36, the carriage motor 37, and an external communication interface 38 are connected to the control unit 40 via a bus. The external communication interface 38 connects the printing device 10 to an external device such as the PC 60.

The PC 60 includes a control unit 70 that controls the operation of the PC 60. The control unit 70 includes a CPU 71, ROM 72, RAM 73, and a hard disc drive (HDD) 74. The CPU 71 is responsible for various processing in the PC 60. Programs such as BIOS executed by the CPU 71 are stored in the ROM 72. Various types of information are temporarily stored in the RAM 73. The HDD 74 is a non-volatile storage medium. A print control data generating program for executing a print control data generating process illustrated in FIG. 7, for example, and various tables (see FIG. 9, for example) are stored in the HDD 74. The programs stored in the HDD 74 may be obtained via CD-ROM or the Internet or the like. A monitor 61, an operation unit 62, and an external communication interface 68 are connected to the control unit 70 via a bus. The monitor 61 displays various images in accordance with control by the control unit 70. Various operation commands by the user are input to the operation unit 62 (such as a keyboard or a mouse or the like). The external communication interface 68 connects the PC 60 to an external device such as the printing device 10.

Print Control Data Generating Process

The print control data generating process executed by the PC 60 will be described with reference to FIG. 7 to FIG. 12. The print control data is data for controlling the operation of the printing device 10. The printing device 10 of the present embodiment prints the dye section 3 on the substrate 2 in accordance with the print control data input from the PC 60.

Figure 7:
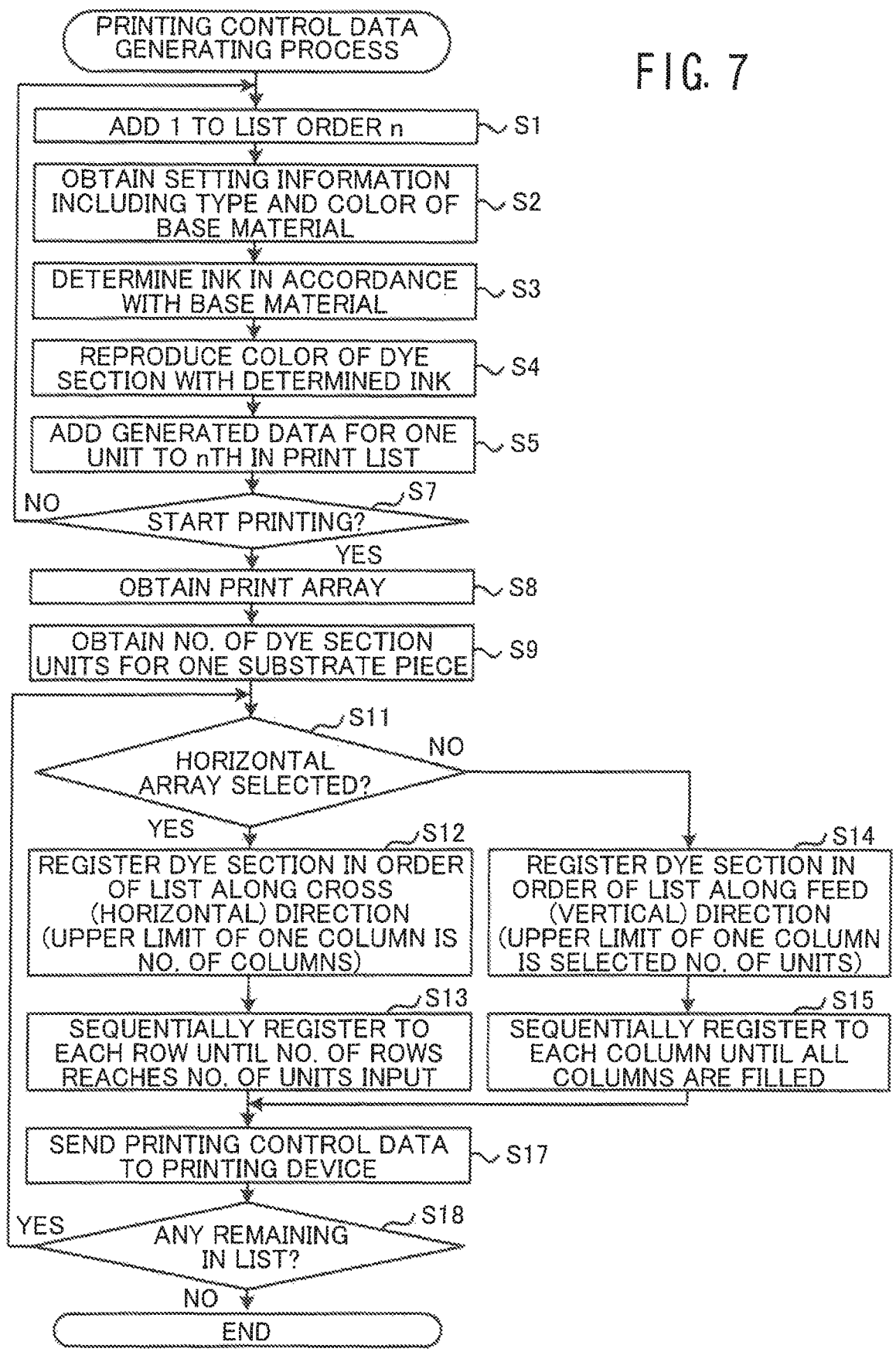
FIG. 7 is a flowchart of a print control data generating process executed by the PC 60.

Upon receiving a command to generate print control data, the CPU 71 of the PC 60 executes the print control data generating process illustrated in FIG. 7, in accordance with the print control data generating program.

The print control data generating process of the present embodiment includes steps (S1 to S7) for generating a print list, and steps (S8 to S18) for generating print control data in accordance with the print list. A print list 89 (see FIG. 8) is a list of the dye-attached substrates 1 to be manufactured. In the print list 89, various types of information including the order in the list (list order) and the color of the dye section 3 to be printed are linked to each unit of the dye-attached substrates 1 to be manufactured. In the print list 89 in FIG. 8, the list order is indicated as "No." and the color is indicated by the code of the "color name." In the steps for generating the print control data (S8 to S18), the printing positions of a plurality of units of the dye sections 3 with respect to the substrate 2 are registered according to the print list 89.

As illustrated in FIG. 7, in the steps (S1 to S7) for generating the print list, first, "1" is added to the list order (S1). In the present embodiment, the value of a counter that manages the list order is "0" at the start of the print control data generating process. Therefore, when the process of S1 is first performed, the value of the counter that manages the list order becomes "1".

Next, the CPU 71 obtains various kinds of setting information including the base material of the resin body to be dyed, and the color of the dye section 3 to be printed on the substrate 2 (in other words, the color of the resin body to be dyed by the dye-attached substrate 1) (S2).

Figure 8:
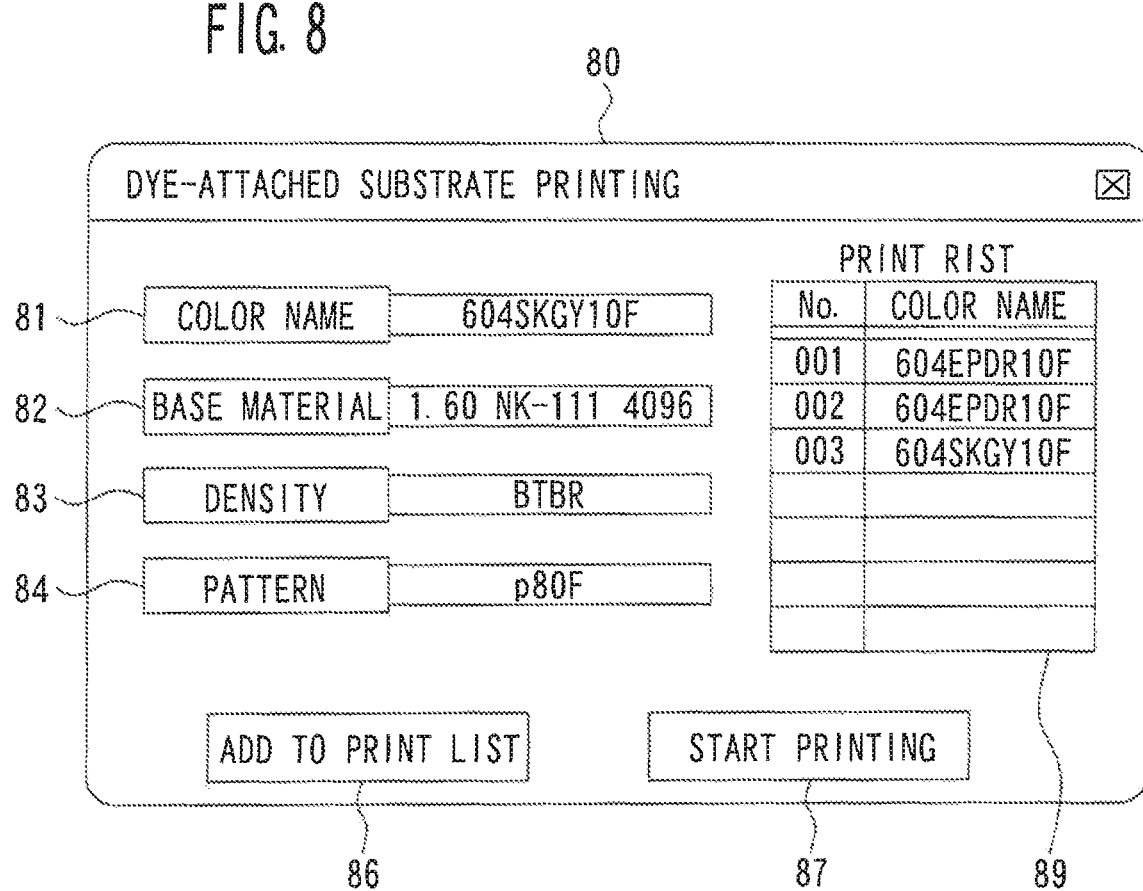
FIG. 8 is a view of an example of a setting information input screen 80.

An example of a method for obtaining the setting information will be described with reference to FIG. 8. In the present embodiment, the CPU 71 displays a setting information input screen 80 (see FIG. 8) on the monitor 61, during the process of generating the print list 89. A color name input field 81, a base material input field 82, a density input field 83, a pattern input field 84, an add-to-list button 86, a print start button 87, and the print list 89 are displayed on the setting information input screen 80.

The color of the dye section 3 to be printed on the substrate 2 (that is, the color of the resin body to be dyed by the dye-attached substrate 1 to be manufactured) is input in the color name input field 81. There may be a case in which the color of the dye section 3 printed on the dye-attached substrate 1 differs in appearance from the color of the resin body to be dyed using this to-be-dyed substrate 1. The base material of the resin body to be dyed is input in the base material input field 82. The density of the color for dyeing the resin body is input in the density input field 83. The printing pattern of the dye section 3 is input in the pattern input field 84. A pattern for dyeing the entire surface of the resin body evenly, a pattern for dyeing the resin body in a gradation manner, or a pattern for changing the density at the center portion and the outer peripheral portion of the resin body, or the like, for example, can be adopted as the printing pattern. The add-to-list button 86 is operated when the user adds an em to the print list 89. In the step S2, when the add-to-list button 86 is operated, various kinds of setting information are input in the various input fields 81 to 84 at that point are obtained as setting information corresponding to the print list to be added. The print start button 87 is operated by the user when beginning to print the dye section 3 on the substrate 2.

Upon obtaining the various types of setting information (S2), the CPU 71 determines the ink to use to print from among the plurality of inks (eight types in the present embodiment), in accordance with the obtained characteristic information (the base material in the present embodiment) (S3). More specifically, the CPU 71 selects, on the basis of the obtained characteristic information, the ink to be used when dyeing the resin body, from a plurality of inks that include at least two or more inks of the same color that have different suitabilities for the resin body.

As an example, in the present embodiment, the CPU 71 selects an ink to be used when dyeing the resin body, from among the plurality of inks, on the basis of corresponding information that is information in which the characteristics of the resin body to be dyed are linked with the ink that is suitable for the resin body. For example, in the present embodiment, an ink determination table (see FIG. 9) that is one type of corresponding information that links the base material of the resin body to be dyed with the ink to be used in the dyeing process, is stored in the HDD 74.

In the ink determination table illustrated in FIG. 9, the determination is made such that the color is reproduced by ink of at least one of the four colors of BK, B, R, and Y, regardless of the base material to be dyed. However, regarding each of the B, R, and Y inks, the table is generated such that one or a plurality of inks suitable for the base material of the resin body to be dyed, from among a plurality of inks of the same color and having mutually different suitabilities for the base material of the resin body, is/are used. In S3 of the present embodiment, the CPU 71 determines the ink corresponding to the base material obtained in S2 to be the ink to be used for printing, by referring to the ink determination table.

In the present embodiment, the characteristic information of the resin body to be dyed is obtained by the CPU 71, by being input via the operation unit 62. However, the method for obtaining the characteristic information may also be changed. For example, the CPU 71 may obtain the characteristic information by receiving the characteristic information from another device.

The method for determining the ink to be used for printing may be changed as appropriate. For example, the corresponding information may be set by operation of the operation unit 62. For example, the ink determination table illustrated in FIG. 9 may be prepared in advance by the manufacturer or the like. The CPU 71 may change the con (that is, the correlation between the characteristic information of the resin body and the ink to be used) of the ink determination table on the basis of an operation command by the user. The CPU 71 may ire create an ink determination table on the basis of an operation command by the user. Also, it is not essential that a table be used. For example, when determining the ink to use for dyeing, the CPU 71 may request that the user input a command to select the ink to be used, and may determine the ink selected by the user as the ink to be used. A program may be prepared in advanced so that ink corresponding to the base material that has been input is automatically selected, without a table being used. Also, the characteristic information of the resin body is not limited to the information of the base material. For example, at least one kind of information, such as the thickness or shape of the resin body to be dyed, may be used as the characteristic information of the resin body. Also, in the present embodiment, one type of ink of each of the four colors is used (that is, four ink heads 33 are always determined as the heads that are used), regardless of the characteristic information of the resin body. However, the CPU 71 may also change the number of inks used, according to the characteristic information of the resin body. Also, the CPU 71 may determine two or more inks of the same color that have different suitabilities for the resin body, as the ink to be used to dye one resin body.

Upon determining the ink to be used (S3), the CPU 71 generates data for printing one unit of the dye section 3 so as to reproduce the color obtained in S2 (in other words, the color selected by the user) with the ink determined in S3 (S4). The CPU 71 adds the generated data for one unit to the nth number in the print list 89 and stores the data (S5). Next, the CPU 71 determines whether a command to start printing has been input (S7). If the command has not been input (S7: NO), the process returns to S1, and the next process of adding to the list order in the print list 89 is performed (S1 to S5). In the present embodiment, the user is able to input a color each time a print list 89 is added. Accordingly, dye-attached substrates 1 of a variety of colors are able to be efficiently manufactured. When the print start button 87 is operated and a command to start printing is input (S7: YES), print control data is generated on the basis of a printing method set by the user (S8 to S18).

The printing method of the dye section 3 of the present embodiment will be described with reference to FIG. 10 and FIG. 11. The dye-attached substrate manufacturing system. 100 of the present embodiment is able to print a plurality of units of the dye sections 3 lined up in the longitudinal direction of the substrate 2 (the up-down direction in FIG. 10 and FIG. 11) on each long thin substrate 2. Accordingly, many units of the dye sections 3 are efficiently printed. Furthermore, in the present embodiment, a substrate piece 29 that includes a plurality of units of the dye sections 3 is created by cutting each of the substrates 2. In this case, various operations after printing the dye section 3 are performed for each substrate piece 29 that includes a plurality of units of the dye sections 3. Accordingly, work efficiency improves compared to when manufacturing a dye-attached substrate 1 that includes only one unit of the dye section 3 immediately after printing the dye section 3. The long thin substrate 2 is used cut as appropriate, so loss of the substrate 2 is also able to be reduced.

Also, in the present embodiment, the user is able to select the number of units of the dye sections 3 included in one substrate piece 29 (the number of units of the dye sections 3 lined up in the longitudinal direction of one substrate piece 29, in the present embodiment). For example, in the example illustrated in FIG. 10 and FIG. 11, the number of units selected by the user (hereinafter, referred to as the "selected number of units") is "5". However, when the selected number of units is "4", four units of the dye sections 3 are formed on each substrate piece 29. Therefore, the degree of freedom when creating the substrate piece 29 increases. Moreover, in the present embodiment, the upper limit of the number of units that the user can select is defined. Therefore, the substrate piece 29 is presented from becoming too large (that is, from becoming too long), which would conversely reduce work efficiency. As an example, the upper limit of the number of units in the present embodiment is "5", but the upper limit may be changed as appropriate.

The print array of the plurality of the dye sections 3 with respect to a plurality of the substrates 2 will be described with reference to FIG. 10 and FIG. 11. In FIG. 10 and FIG. 11, the up-down direction in the drawings is the feed direction of the substrates 2 by the feed portion 23 (this direction is also referred to as the vertical direction or the column direction). The left-right direction in the drawings is a cross direction that intersects the feed direction (this direction is also referred to as the horizontal direction or the row direction).

Figure 10:
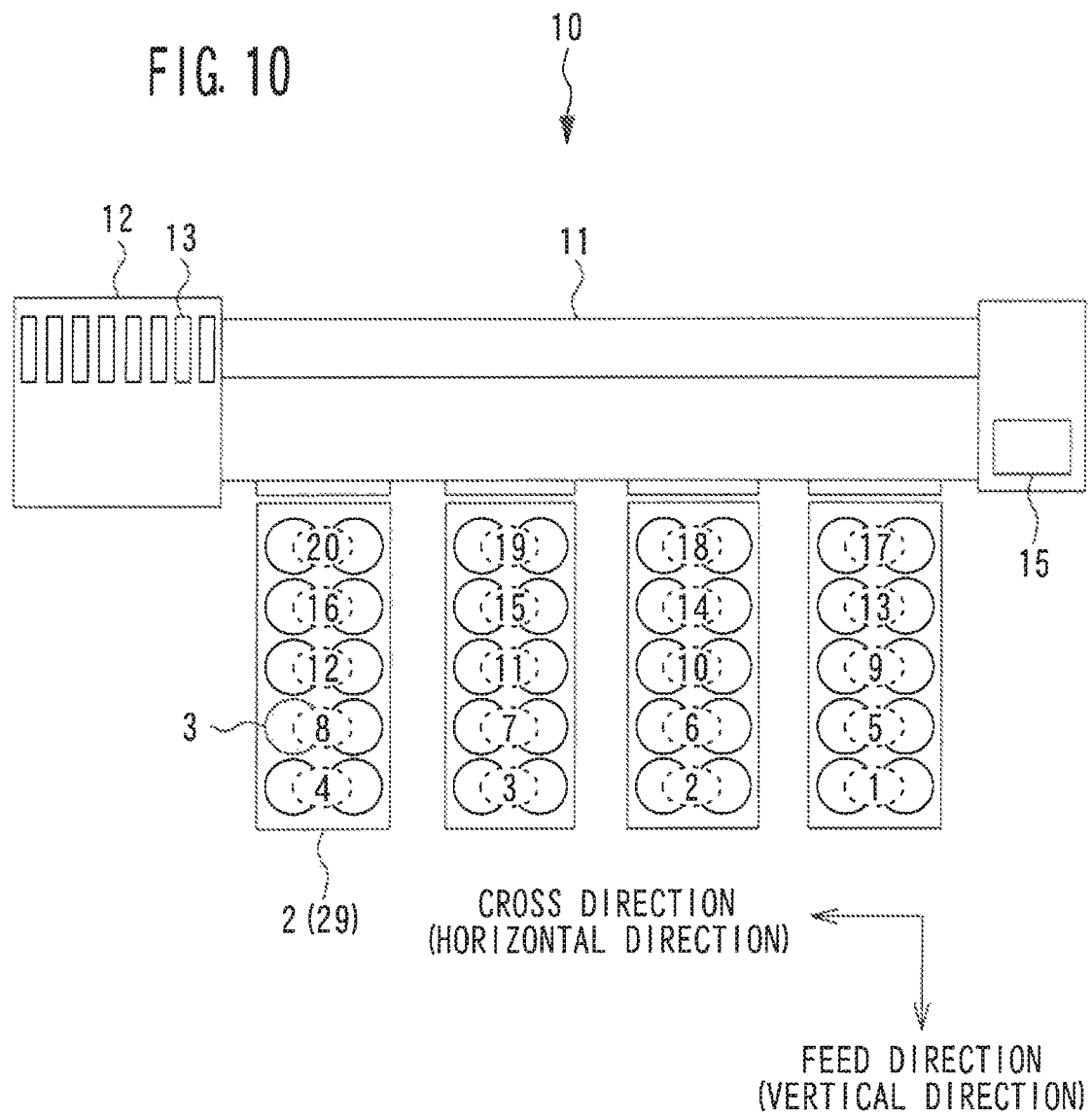
FIG. 10 is a view illustrating a printing position of a plurality of dye sections 3 with respect to each substrate piece 29, when horizontal array printing is performed.

As illustrated in FIG. 10, with the dye-attached substrate manufacturing system 100 of the present embodiment, a plurality of units of the dye sections 3 can be lined up in accordance with the order in which the units were registered along the cross direction that intersects the feed direction. Hereinafter, the printing illustrated in FIG. 10 will be referred to as horizontal array printing. With the horizontal array printing illustrated in FIG. 10, four units of the dye sections 3 are lined up, one unit on each of four (four columns of) substrates 2, in the order in which the units were registered, from the right side toward the left side. When the printing of the dye sections 3 in one lime (one row) in the cross direction is complete, the printing of one line of the dye sections 3 is performed again in a position offset in the feed direction from the one line of the dye sections 3 the printing of which is complete, in accordance with the order in which the dye sections 3 were registered. In the example illustrated in FIG. 10, the selected number of units is "5". Therefore, a maximum of four columns by five rows of the dye sections 3 are printed on the four substrates 2 by one series of printing operations. With lateral printing, to the greatest extent possible, an equal number of a plurality of the dye sections 3 are printed on each of the plurality of substrates 2. Therefore, the dye sections 3 are efficiently printed on the plurality of substrates 2.

The order in which the dye sections 3 are registered increases by one from the right side toward the left side in the example illustrated in FIG. 10. However, the order in which the dye sections 3 are registered may increase from the left side toward the right side. Also, for example, the registration order may be arranged so as to be "1", "3", "2", and "4" from the right side. The registration order may also be arranged so as to be "1", "4", "2", and "3" from the left side. That is, "lined up in accordance with the order in which the dye sections 3 are registered along the cross direction" is not meant to be limited to a case in which the order in which the dye sections 3 are registered is in ascending order from one direction toward the other direction in the cross direction, but also includes a case in which a maximum of four units of the dye sections 3 that have been registered in a consecutive order are lined up along the cross direction regardless of whether they are large or small in the registration order.

Figure 11:
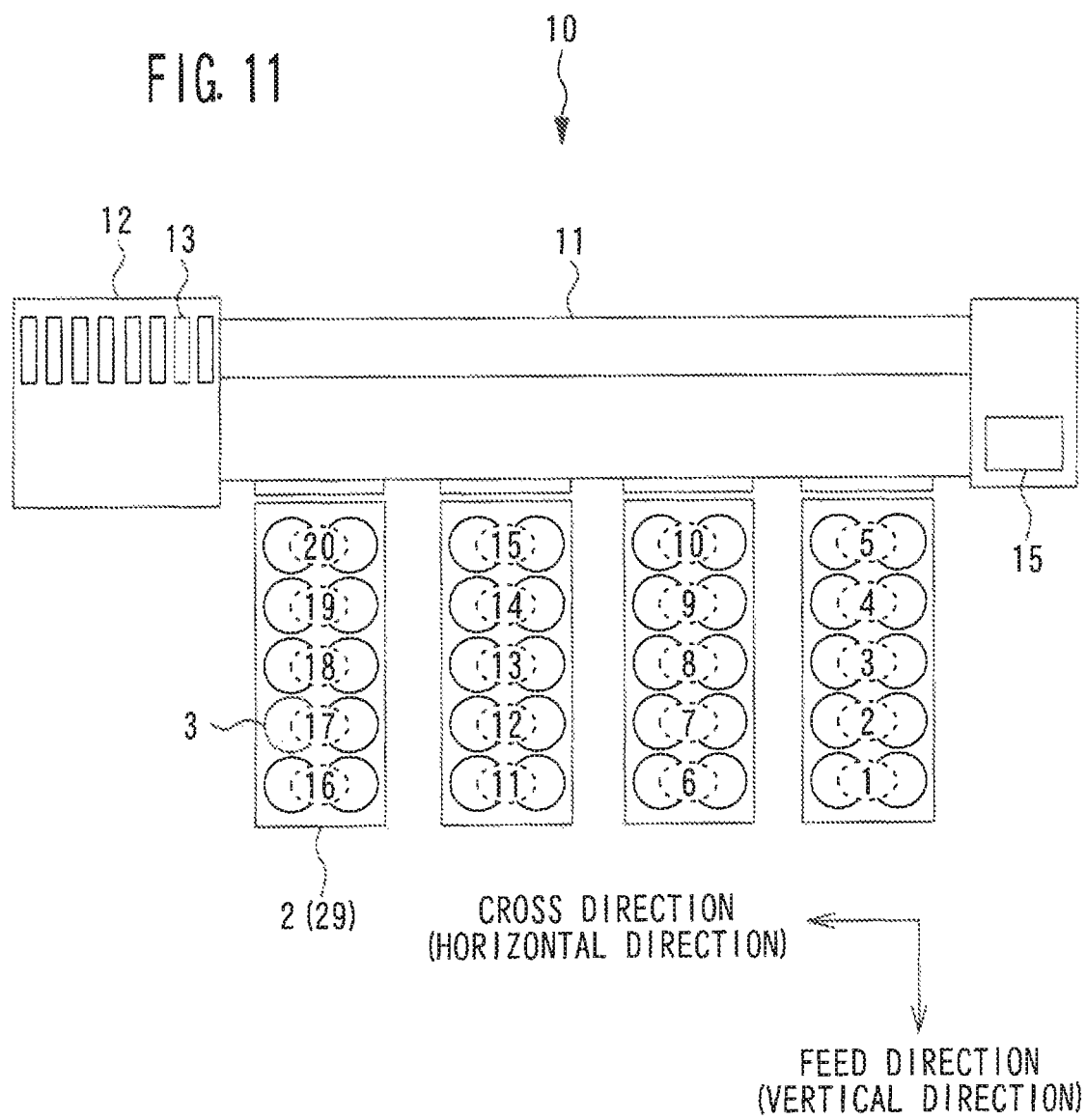
FIG. 11 is a view illustrating a printing position of a plurality of the dye sections 3 with respect to each substrate piece 29, when vertical array printing is performed.

As illustrated in FIG. 11, with the dye-attached substrate manufacturing system 100 of the present embodiment, a plurality of units of the dye sections 3 can be lined up in accordance with the order in which the units were registered along the feed direction. Hereinafter, the printing illustrated in FIG. 11 will be referred to as vertical array printing. With the vertical array printing illustrated in FIG. 11, a plurality of units of the dye sections 3 are lined up along the feed direction in the order in which the units were registered, with respect to each of the four (four columns) of substrates 2. More specifically, in the example illustrated in FIG. 11, the dye sections 3 registered in the order of "1" to "5" are lined up on the rightmost substrate 2. The dye sections 3 registered in the order of "6" to "10" are lined up on the substrate 2 second from the right. The dye sections 3 registered in the order of "11" to "15" are lined up on the substrate 2 third from the right. The dye sections 3 registered in the order of "16" to "20" are lined up on the substrate 2 fourth from the right. In the example illustrated in FIG. 11, the selected number of units is "5". Therefore, with one series of printing operations, five units of the dye sections 3 are printed on each substrate 2. With vertical printing, the user can collectively manage a plurality of units of the dye sections 3 that have been registered in a consecutive order for each substrate 2.

The printing device 10 of the present embodiment can print a plurality of units of the dye sections 3 in parallel on a plurality of substrates 2, by main scanning the carriage 30 across the plurality of substrates 2. Therefore, in the example illustrated in FIG. 11, the dye sections 3 registered in the order of "1", "6", "11", and "16" are first printed in parallel, and then the dye sections 3 registered in the order of "2", "7", "12", and "17" are printed in parallel. Therefore, the number of times the plurality of substrates 2 are fed is reduced compared to when the printing of a plurality of units of the dye sections 3 on each of the substrates 2 is performed separately.

In the present embodiment, the user is able to select one of a plurality of printing arrays including lateral printing and vertical printing, and cause the printing device 10 to print with the selected print array. As a result, the user is able to cause the printing device 10 to print according to a desired printing method, in accordance with the manufacturing efficiency and management efficiency and the like of the dye-attached substrate 1.

Figure 12:
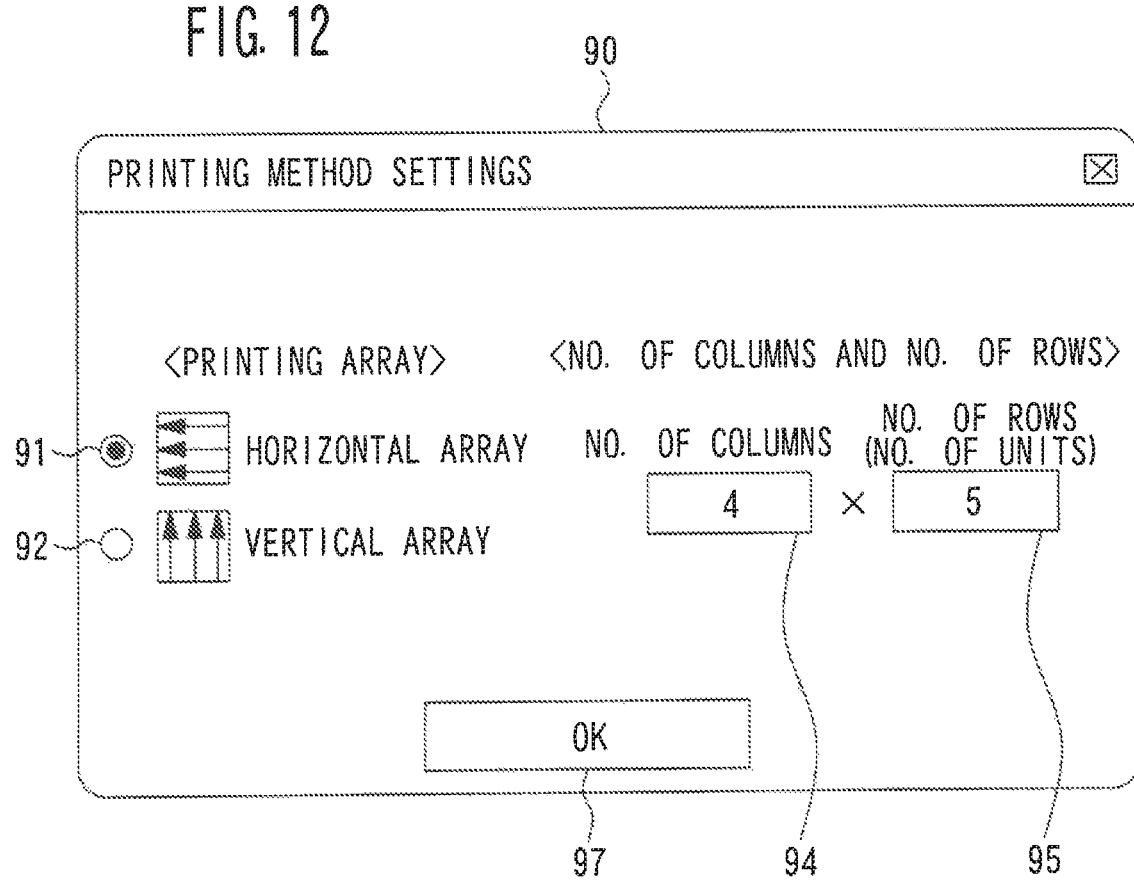
FIG. 12 is a view of an example of a printing method settings screen 90.

An example of a method for setting the printing method will be described with reference to FIG. 12. In the present embodiment, the CPU 71 can display a printing method settings screen 90 (see FIG. 12) on the monitor 61. The timing at which the printing method settings screen 90 is displayed may be after a command to start printing is input, or an arbitrary timing when a command to start setting the printing method is input, for example. A horizontal array printing selection button 91, a vertical array printing selection button 92, a column number input field 94, a row number (selected number of units) input field 95, and an OK, button 97 are displayed on the printing method settings screen 90.

The horizontal array printing selection button 91 is operated by the user when horizontal array printing is to be selected. The vertical array printing selection button 92 is operated by the user when vertical array printing is to be selected. In the column number input field 94, the number of substrates 2 on which the dye section 3 is to be printed (that is, the number of columns used), within a range equal to or less than a predetermined upper limit (four columns in the present embodiment), is input. In the row number (selected number of units) input field. 95, the number of units of the dye sections 3 to be lined up in the feed direction on each substrate 2 is input. As described above, in the present embodiment, the upper limit of the selected number of units is defined. The user inputs the selected number of units within a range equal to or less than a defined upper limit value. The OK button 97 is operated by the user when the setting of the printing method is complete.

Now the description will return to FIG. 7. When the print start button 87 is operated and a command to start printing is input (S7: YES), the CPU 71 obtains the selected number of units selected by the user (S8). The CPU 71 obtains the printing array (horizontal array printing or vertical array printing, in the present embodiment) selected by the user (S9).

If the selected printing array is horizontal array printing (S11: YES), a process for generating print control data to cause the printing device 10 to execute horizontal array printing (a horizontal array data generating process) is performed (S12 and S13). More specifically, the CPU 71 of the present embodiment registers the printing positions of a plurality of units of the dye sections 3 in order along the cross direction, in accordance with the list order (S12). As described above, the upper limit of the number of units of the dye sections 3 lined up in one row along the cross direction is the number of columns to be used. Also, the CPU 71 of the present embodiment sequentially executes printing registration to each of the rows until the number of rows for which printing registration of the dye sections 3 is complete reaches the selected number of units (S13). If all of the listed printing registration stored in the print list 89 is completed before registration of the maximum number of units that can be registered (for example, the number of units of "four columns" by "five rows", in the example illustrated in FIG. 10 and FIG. 11) is complete, the process moves on to S17 at this point.

If the selected printing array is vertical array printing (S11: NO), a process for generating print control data to cause the printing device 10 to execute vertical array printing (a vertical array data generating process) is performed (S14 and S15). More specifically, the CPU 71 of the present embodiment registers the printing positions of a plurality of units of the dye sections 3 in the list order along the feed direction for each substrate 2 (S14). As described above, the upper limit of the number of units of the dye sections 3 lined up in one column in the vertical direction for each substrate 2 is the selected number of units. Also, the CPU 71 of the present embodiment sequentially executes printing registration to each of the columns until the number of columns for which printing registration of the dye sections 3 is complete reaches the number of columns to be used (that is, the number of substrates 2 to be printed) (S15). If all of the listed printing registration stored in the print list 89 is completed before registration to all of the columns to be used is complete, the process moves on to S17 at this point. The series of print control data for printing a selected number of units of the dye sections 3 on the substrates 2 in the vertical direction is completed according to the foregoing process.

The CPU 71 sends the print control data generated according to S12 to S15 to the printing device 10 (S17). The CPU 71 determines whether there is data for the dye sections 3 that have not yet been registered for printing remaining in the print list 89 (S18). If there is data remaining (S18: YES), the process returns to S11, and the series of print control data is generated again. If there is no data remaining in the print list 89 (S18: NO), the print control data generating process ends.

Printing Process

The printing process executed by the printing device 10 will be described with reference to FIG. 13. With the printing device 10 of the present embodiment, a printing program for controlling the printing process is stored in the ROM 42. Upon receiving print control data from the PC 60, the CPU 41 of the printing device 10 executes the print control data generating process illustrated in FIG. 13, in accordance with the printing program.

As illustrated in FIG. 13, when the printing process starts, the CPU 41 selects the ink to be used for printing (dyeing) from among a plurality of inks (S21). As described above, the printing device 10 of the present embodiment includes a larger number of ink heads 33 than the number of colors used to print on the substrate 2. The plurality of inks discharged from each of the ink heads 33 include at least two or more inks of the same color that have different suitabilities for the resin body. The CPU 41 determines the ink to use for dyeing (that is, the ink head 33 to be used), on the basis of the characteristic information of the resin body to be dyed. In the present embodiment, the ink to be used is determined by the PC 60, and the information of the ink to be used is included in the print control data. The CPU 41 determines the ink to be actually used for printing, in accordance with the information of the ink to be used, which is included in the print control data. However, the CPU 41 of the printing device 10 may also determine the ink to be used, on the basis of the characteristic information of the resin body.

Next, the CPU 41 determines whether the received print control data is print control data for horizontal array printing (S22). If the received print control data is print control data for horizontal array printing (S22: YES), the CPU 41 prints the plurality of the dye sections 3 that have been registered for printing, lined up along the cross direction in the order in which the dye sections 3 were registered, in accordance with the print control data (S23). More specifically, the CPU 41 of the present embodiment prints the dye sections 3 that are lined up in the cross direction in the order in which the dye sections 3 were registered, one row at a time on the plurality of substrates 2. That is, if, after the printing of one row of the dye sections 3 is complete, there are dye sections 3 that have not yet been printed, the CPU 41 continues to print the dye sections 3 that have not yet been printed, in a position offset in the feed direction from the dye sections 3 for which printing is complete.

If the received print control data is print control data for vertical array printing (S22: NO), the CPU 41 prints the plurality of the dye sections 3 that have been registered for printing, lined up along the feed direction in the order in which the dye sections 3 were registered, in accordance with the print control data (S24). More specifically, the CPU 41 of the present embodiment prints the dye sections 3 that are lined up in the feed direction in the order in which the dye sections 3 were registered, one row at a time on one or a plurality of the substrates 2.

Next, the CPU 41 determines whether a predetermined row of printing that is defined by the print control data is complete (S25). If the predetermined row of printing is not complete (S25: NO), the printing operation is continued until the predetermined row of printing is complete. When the predetermined row of printing is complete (S25: YES), the CPU 41 creates a substrate piece 29 by controlling the driving of the cutter 24 by the cutter driving motor 36 and cutting the substrate 2 between a portion on which the dye section 3 is printed and a portion on which the dye section 3 is not printed (S26). Next, the CPU 41 determines whether the printing of all of the print control data received from the PC 60 is complete (S27). If the printing is not complete (S27: NO), the process returns to S21, and the next substrate piece 29 is created (S21 to S26). When the printing of all of the print control data is complete (S27: YES), the printing process ends.

Manufacturing Process of Dye-Attached Substrate

The manufacturing method of the dye-attached substrate of the present embodiment will be described with reference to FIG. 14. First, the user selects the number of units (the selected number of units) of the dye section 3 to include in one substrate piece 29, within a range equal to or less than an upper limit value (S31). As described above, in the present embodiment, the user inputs the selected number of units to the PC 60. However, the selected number of units may also be input to the printing device 10 or the like, for example. Next, the user sets (arranges) the substrate 2 in the printing device 10 such that the outside surface of the roll-shaped to-be-dyed substrate 2 faces the ink heads 33 of the printing device 10 (S32). As a result, the area near the tip end portion of the substrate 2 is inhibited from bending toward the ink heads 33.

Next, the user prints a predetermined number of the dye sections 3 lined up in the longitudinal direction on each of the substrates 2, with the printing device 10 (S34). The user then creates the substrate piece 29 on which a plurality of units of the dye sections 3 are printed, by cutting the substrate 2 (S35). As described above, in the present embodiment, the substrate piece 29 is created by the substrate 2 being cut with the cutter 24 of the printing device 10. However, the user may also cut the substrate 2 himself or herself, or cut the substrate 2 using another device (e.g., a sheet cutter), for example.

When the printing of all of the print control data is complete (S36: YES), the user dries the ink that has been printed on the substrate piece 29 (S38). As an example, in the present embodiment, a process for drying the ink of the substrate piece 29 is performed by setting each of the substrate pieces 29 in a drying jig (not shown), and setting the drying jig in a dryer (such as a blower or an oven, for example). Accordingly, the drying process is performed efficiently compared to when drying substrates 2 that have been cut one unit at a time. The drying process may be modified. For example, the ink may be dried by leaving the substrate piece 29 for a predetermined period of time or longer, without using a dryer.

Next, the user creates a dye-attached substrate (unit substrate) 1 that includes one unit of the dye section 3, by further cutting the substrate piece 29 on which the ink has dried (S39). As a result, when performing the transfer process, the user is able to easily select and use an appropriate dye-attached substrate 1 according to the desired dyeing color. As an example, in S39 of the present embodiment, the substrate piece 29 is cut every one unit by a sheet cutter. However, the method of cutting the substrate piece 29 may be changed as appropriate. For example, the user may cut the substrate piece 29 by hand. With the foregoing process, the process of manufacturing a dye-attached substrate ends.

As described above, the method for manufacturing a dye-attached substrate that is an aspect of the present embodiment is a method for manufacturing a dye-attached substrate used in a dyeing process for dyeing a resin body by heating a sublimable dye so as to cause the dye to sublimate toward the resin body. The method for manufacturing a dye-attached substrate of the present embodiment includes an arranging step and a printing step. The arranging step is a step of arranging the to-be-dyed substrate 2, to which dye is adhered and which is formed in a roll shape, and in which the surface on the side where the dye is adhered is formed on the outside surface of the roll-shaped to-be-dyed substrate 2, in the printing device 10 such that the outside surface of the to-be-dyed substrate 2 faces the ink heads 33 of the printing device 10, when using the printing device 10 to print the dye on the to-be-dyed substrate 2. The printing step is a step of printing the dye on the to-be-dyed substrate 2, by the ink heads 33 discharging ink that includes the dye to be deposited on a resin body, toward the to-be-dyed substrate 2.

According to the present embodiment, the tip of the roll-shaped to-be-dyed substrate 2 is inhibited from bending toward the ink heads 33. Therefore, the occurrence of problems (for example, clogging of the ink heads, and the to-be-dyed substrate 2 getting ensnared and the like) that occur due to the tip of the to-be-dyed substrate 2 coming into contact with the ink heads 33 is suppressed. Also, problems (for example, color unevenness and the like) that occur due to the distance between the to-be-dyed substrate 2 and the ink heads 33 becoming uneven are suppressed. Also, in the present embodiment, the dye-attached substrate 1 is manufactured while cutting the roll-shaped to-be-dyed substrate 2. Therefore, it is no longer necessary to use a to-be-dyed substrate that has been precut, so the manufacturing cost is easily reduced.

The to-be-dyed substrate 2 of the present embodiment includes the electromagnetic wave absorbing layer 52 that has a higher electromagnetic wave absorption rate than the material of the to-be-dyed substrate 2, on the surface that is on the side opposite the side to which the dye adheres. The electromagnetic wave absorbing layer 52 is formed on an inside surface of the roll-shaped to-be-dyed substrate 2. Therefore, according to the present embodiment, the dye-attached substrate 1 having the electromagnetic wave absorbing layer 52 is quickly, manufactured. Also, the dye-attached substrate 1 having the electromagnetic wave absorbing layer 52 is manufactured at a low cost.

The method for manufacturing a dyed resin body that is an aspect of the present embodiment includes a depositing step and a fixing step. The depositing step is a step of subliming the dye and depositing the dye on the resin body, by making the dye-attached substrate 1 manufactured according to the method for manufacturing a dye-attached substrate described above face the resin body, and heating the dye adhered to the dye-attached substrate 1. The fixing step is a step of fixing the dye on the resin body, by heating the resin body on which the dye has been deposited. According to the present embodiment, the dyed resin body is efficiently manufactured.

The printing control device (for example, the PC 60) that is an aspect of the present embodiment includes obtaining means and selecting means. The obtaining means obtains the characteristic information of the resin body to be dyed. The selecting means selects, on the basis of the characteristic information of the resin body, the ink to be used when dyeing the resin body, from a plurality of inks that include a sublimable dye to be deposited on the resin body, and that include at least two or more inks of the same color that have different suitabilities for the resin body. According to the present embodiment, dyeing is performed so that the color desired by the user is obtained. Also, because printing is performed with the appropriate ink corresponding to the characteristics of the resin body selected, the resin body is suitably dyed. Also, the dye-attached substrate 1 is quickly manufactured.

The printing control device of the present embodiment selects the ink to be used when dyeing the resin body, from among the plurality of inks, on the basis of corresponding information that is information in which the characteristic information of the resin body is linked to the appropriate ink. The corresponding information may be set by operation of the operation unit 62 by the user. In this case, even if a new type of resin body is to be dyed, an ink suitable for the resin body is easily selected. Also, even when it is difficult to perform dying in the desired color due to effects from changes in the environment such as temperature and humidity, the user is able to adjust the dyeing process by setting the corresponding information.

The printing device 10 that is an aspect of the present embodiment includes the ink heads 33, the control unit 40, the obtaining means, and the selecting means. The ink heads 33 discharge ink that includes a sublimable dye toward the to-be-dyed substrate 2. The number of ink heads 33 included in the printing device 10 is greater than the number of colors of ink used for printing on the to-be-dyed substrate 2. The control unit 40 controls the operation of the printing device 10. The obtaining means obtains the characteristic information of the resin body to be dyed. The selecting means selects, on the basis of the characteristic information of the resin body, the ink to be used when dyeing the resin body, from a plurality of inks that include at least two or more inks of the same color that have different suitabilities for the resin body. Therefore, the resin body is suitably manufactured.

The printing control program that is an aspect of the present embodiment is executed in the printing control device (for example, the PC 60) that controls the operation of the printing device 10. An obtaining step and a selecting step are executed by the printing control device, by the printing control program being executed by a processor of the printing control device. The obtaining step is a step of obtaining the characteristic information of the resin body to be dyed. The selecting step is a step of selecting, on the basis of the characteristic information of the resin body, the ink to be used when dyeing the resin body, from a plurality of inks that include at least two or more inks of the same color that have different suitabilities for the resin body. According to the printing control program of the present embodiment, the resin body is suitably manufactured.

The method for manufacturing a dye-attached substrate that is an aspect of the present embodiment is a method for manufacturing the dye-attached substrate 1 provided with the dye section 3 that includes a sublimable dye to be deposed on a resin body, and includes a printing step, a piece creating step, and a drying step. The printing step is a step of printing a plurality of units of the dye sections 3, the dye section 3 for dyeing one resin body or one set of resin bodies constituting one unit, lined up in the longitudinal direction of the substrate 2, by discharging the ink that includes a sublimable dye on a long thin substrate 2 with the printing device 10. The piece creating step is a step of creating the substrate piece 29 that includes a plurality of units of the dye sections 3, by cutting the substrate 2 on which the dye section 3 is printed. The drying step is a step of drying the ink of the plurality of units of the dye sections 3 included on the substrate piece 29.

According to the present embodiment, various operations performed after printing (for example, at least one of a transporting operation and a drying operation of the substrate 2 and the like) are performed for each substrate piece 29 including the plurality of units of the dye sections 3. Accordingly, the dye-attached substrate 1 is efficiently manufactured. Furthermore, the long thin substrate 2 is used cut as appropriate, so loss of the substrate 2 is also easily reduced.

The piece creating step of the present embodiment is performed by the cutter 24 included in the printing device 10. Accordingly, in the present embodiment, the substrate piece 29 is efficiently created by the printing device 10.

In the present embodiment, printing the plurality of units of the dye sections 3 in the printing step, and creating the substrate piece 29 in the piece creating step are alternately executed by the printing device 10. Accordingly, even when creating a plurality of substrate pieces 29, the printing device 10 is able to create the substrate pieces 29 efficiently.

The method for manufacturing a dye-attached substrate of the present embodiment further includes a unit substrate creating step of creating the substrate 2 including one unit of the dye section 3, by further cutting the substrate piece 29 in which the ink has been dried in the drying step. Accordingly, when performing the transfer process, the user is able to easily select and use an appropriate dye-attached substrate 1 according to the desired dyeing color.

The method for manufacturing a dye-attached substrate of the present embodiment further includes a unit number inputting step of inputting a command for selecting the number of units of the dye sections 3 to be included in one substrate piece 29, within a range equal to or less than a predetermined upper limit value. In the printing step, the selected number of units of the dye sections 3 are printed on the substrate 2 by the printing device 10. Therefore, the degree of freedom when creating the substrate piece 29 increases. For example, it is also easy to manufacture a small number of the dye-attached substrates 1. Moreover, in the present embodiment, the upper limit of the number of units that the user can select is defined. Therefore, the substrate piece 29 is prevented from becoming too large, which would conversely reduce work efficiency.

The printing device 10 that is an aspect of the present embodiment includes the ink heads 33, the cutter 24, and the control unit 40. The ink heads 33 print the dye section 3 on the substrate 2 by discharging ink that includes a sublimable dye to be deposited on a resin body, toward the substrate 2. The cutter 24 cuts the substrates 2. The control unit 40 controls the operation of the printing device 10. The control unit 40 prints a plurality of units of the dye sections 3, the dye section 3 for dyeing one resin body or one set of resin bodies constituting one unit, on the long thin substrate 2, by controlling the driving of the ink heads 33. The control unit 40 creates the substrate piece 29 that includes a plurality of units of the dye sections 3, by controlling the driving of the cutter 24 and cutting the substrate 2. According to the printing device 10 of the present embodiment, the dye-attached substrate 1 is efficiently manufactured.

The printing device 10 that is an aspect of the present embodiment includes the substrate loading portion 20, the feed portion 23, the ink heads 33, and the control unit 40. The substrate loading portion 20 loads a plurality of the long thin sheet-like substrates 2. The feed portion 23 feeds out a plurality of the substrates 2 loaded on the substrate loading portion 20 along the longitudinal direction of the substrate 2. The ink heads 33 print the dye section 3 that includes the sublimable dye on the plurality of substrates 2 by discharging ink that includes the sublimable dye to be deposited on a resin body, toward the plurality of substrates 2 fed by the feed portion 23. The control unit 40 controls the operation of the printing device 10. The control unit 40 prints one unit or a plurality of units of the dye sections 3, the dye section 3 for dyeing one resin body or one set of resin bodies constituting one unit, on the plurality of substrates 2, by controlling the driving of the feed portion 23 and the ink heads 33. According to the present embodiment, a plurality of the dye-attached substrates 1 are efficiently manufactured compared to when the dye section 3 is printed on only one substrate 2.

In the present embodiment, when printing a plurality of units of the dye sections 3 that have been registered for printing on the plurality of substrates 2, the control unit 40 executes horizontal array printing in which a plurality of units of the dye sections 3 are lined up in accordance with the order in which the units were registered, along the cross direction that intersects the feed direction of the plurality of substrates 2 by the feed portion 23. With horizontal array printing, to the greatest extent possible, an equal number of the dye sections 3 are printed on the plurality of substrates 2. That is, the frequency with which a plurality of the dye sections 3 are printed on a specific substrate 2, and the dye sections 3 are not printed on another substrate 2, decreases. Therefore, with horizontal array printing, the dye sections 3 are efficiently printed on the plurality of substrates 2.

In the present embodiment, if, after the printing of one row of the dye sections 3 along the cross direction that are lined up in accordance with the order in which the dye sections 3 were registered, there are dye sections 3 that have been registered for printing but not printed yet, the control unit 40 is able to print the dye sections 3 that have not yet been printed, lined up along the cross direction, in a position offset in the feed direction from the row of the dye sections 3 that have been printed. Accordingly, the printing device 10 of the present embodiment is also able to print a plurality of units of the dye sections 3 on each of the substrates 2, while efficiently printing the dye section 3 on the plurality of substrates 2 by horizontal array printing.

In the present embodiment, when printing a plurality of units of the dye sections 3 that have been registered for printing on the plurality of substrates 2, the control unit 40 executes vertical array printing in which a plurality of units of the dye sections 3 are lined up in accordance with the order in which the units were registered, along the feed direction of the plurality of substrates 2 by the feed portion 23. With vertical array printing, a plurality of units of the dye sections 3 that have been registered in a consecutive order are printed lined up on one substrate 2. Therefore, with vertical array printing, it is possible to collectively manage a plurality of the dye sections 3 that have been registered in a consecutive order for each substrate 2.

The control unit 40 of the present embodiment executes one of a plurality of printing methods including horizontal array printing and vertical array printing, in accordance with a command input by the user to select the printing method. Therefore, the user is able to cause the printing device to print according to a desired printing method, in accordance with the manufacturing efficiency and management efficiency and the like of the dye-attached substrate 1.

The control unit 40 of the present embodiment sets the number of the dye sections 3 to be lined up on the substrate 2 along the feed direction in the order in which the dye sections 3 were registered, to equal or less than a predetermined upper limit value, when executing vertical array printing. Therefore, it is possible to prevent a large number of the dye sections 3 from being printed on one substrate 2, which would conversely end up reducing the management efficiency.

The control unit 40 of the present embodiment is able to print dye sections 3 of different colors on each of a plurality of substrates 2. Accordingly, the user is able to efficiently obtain dye-attached substrates of various colors.

The printing control data generating program that is an aspect of the present embodiment is executed by a data generating device (the PC 60 in the present embodiment is one example) for generating printing control data for controlling the operation of the printing device 10. The printing device 10 includes the substrate loading portion 20, the feed portion 23, and the ink heads 33. A data generating step is executed by the data generating device, by the printing control data generating program being executed by a processor of the data generating device. The data generating step is a step of generating printing control data to print one unit or a plurality of units of the dye sections 3 on a plurality of substrates 2, the dye section 3 for dyeing one resin body or one set of resin bodies constituting one unit. According to the present embodiment, a plurality of the dye-attached substrates 1 are efficiently manufactured compared to when the dye section 3 is printed on only one substrate 2.

The data generating step in the present embodiment includes a horizontal array data generating step of generating printing control data by registering the printing positions of a plurality of units of the dye sections 3 in order along a cross direction that intersects the feed direction of a plurality of substrates 2 by the feed portion 23. With horizontal array data generating step, to the greatest extent possible, an equal number of a plurality of the dye sections 3 are printed on the plurality of substrates 2.

The data generating step in the present embodiment includes a vertical array data generating step of generating printing control data by registering the printing positions of a plurality of units of the dye sections 3 in order along a feed direction of a plurality of substrates 2 by the feed portion 23. According to the vertical array data generating step, it is possible to collectively manage a plurality of the dye sections 3 that have been registered in a consecutive order for each substrate 2.

In the present embodiment, one of a plurality of data generating steps including the horizontal array data generating step and the vertical array data generating step is executed in response to a selection command input by the user. Therefore, the user is able to cause the printing device to print according to a desired printing method, in accordance with the manufacturing efficiency and management efficiency and the like of the dye-attached substrate 1.

The technology disclosed in the embodiment described above is merely an example. Therefore, the technology illustrated by the embodiment described above may be modified. For example, in the embodiment described above, the printing control data generating process (see FIG. 7) is executed by the PC 60. However, at least a portion of the printing control data generating process may be executed by another device. For example, the control unit 40 of the printing device 10 may execute at least a portion of the printing control data generating process. That is, the printing device 10 itself may function as a printing control device or a data genera ng device that generates printing control data.

In the embodiment described above, the dye-attached substrate 1 that includes one unit of the dye section 3 is manufactured by first manufacturing the substrate piece 29 and drying the dye section 3, and then cutting the substrate piece 29. The vapor deposition process is performed by the dye-attached substrate 1 that includes one unit of the dye section 3. However, a dye-attached substrate that includes a plurality of units of the dye sections 3 may also be manufactured. For example, the substrate piece 29 on which a plurality of units of the dye sections 3 are printed may be used as it is as the dye-attached substrate 1 in the vapor deposition process. In this case, it is no longer necessary to set the to-be-dyed substrates 1 one by one in the vapor deposition jig 7 for dyeing one unit of resin bodies. Also, it is no longer necessary to further cut the substrate piece 29. Therefore, the efficiency of the dyeing process is further improved. Also, the dye sections 3 may be dried as they are without cutting the long thin substrate 2 on which a plurality of the dye sections 3 have been printed. In this case, the substrate 2 may be cut after the dye sections 3 are dried. Also, the substrate 2 may be stored rolled up again after drying the dye sections 3.

It is also possible to apply an antistatic agent to at least one of the substrate 2 and the ink. As an example, an antistatic agent may be applied to the ink that forms the electromagnetic wave absorbing layer 52. In this case, an antistatic agent is adhered to a wide area of the substrate 2. Also, an antistatic agent may be applied to the ink that includes the sublimable dye. Applying an antistatic agent to at least one of the substrate 2 and the ink inhibits dust and the like from adhering to the dye-attached substrate 1. As a result, the dyeing quality of the resin body improves.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A method for manufacturing a dyed resin body using a dye-attached substrate provided with a dye section that includes a sublimable dye to be deposited on a resin body, the method comprising:
    printing a plurality of units of the dye sections, each dye section for dyeing one resin body or one set of resin bodies constituting one unit, lined up in a longitudinal direction of a long thin substrate, by discharging ink that includes the sublimable dye on the substrate using a printing device, wherein the resin body is a lens,
    creating a piece of the substrate that includes the plurality of units of the dye sections, by cutting the substrate on which the dye section is printed;
    drying the ink of the plurality of units of the dye sections included in the piece of the substrate;
    heating the sublimable dye, the sublimable dye subliming toward the resin body and being deposited on the resin body after the sublimable dye is heated; and
    heating the resin body on which the sublimable dye has been deposited, the sublimable dye being fixed to the resin body after the resin body is heated.

2. The method according to claim 1, wherein
    the substrate is cut by a cutter included in the printing device.

3. The method according to claim 2, wherein
    the printing of the plurality of units of the dye sections and the creating of the piece of the substrate are alternately executed by the printing device.

4. The method according to claim 1, further comprising:
    creating the substrate that includes one of the units of the dye sections, by further cutting the piece of the substrate on which the ink is dried.

5. The method according to claim 1, further comprising:
    inputting a command for selecting the number of units of the dye sections to be included in one piece of the substrate, within a range equal to or less than a predetermined upper limit; and
    printing the selected number of units of the dye sections on the substrate by the printing device.

* * * * *